US012635606B2

(12) United States Patent
O'Connor et al.

(10) Patent No.: US 12,635,606 B2
(45) Date of Patent: May 26, 2026

(54) MULTI PASS UNLOADING OPERATION

(71) Applicant: Deere & Company, Moline, IL (US)

(72) Inventors: Kellen E. O'Connor, Clive, IA (US);
Jeremy J. Faust, Grimes, IA (US);
Sara C. O'Connor, Clive, IA (US)

(73) Assignee: Deere & Company, Moline, IL (US)

( * ) Notice: Subject to any disclaimer, the term of this
patent is extended or adjusted under 35
U.S.C. 154(b) by 371 days.

(21) Appl. No.: 18/447,718

(22) Filed: Aug. 10, 2023

(65) Prior Publication Data

US 2024/0138298 A1 May 2, 2024
US 2025/0287873 A2 Sep. 18, 2025

Related U.S. Application Data

(60) Provisional application No. 63/512,368, filed on Jul.
7, 2023, provisional application No. 63/381,178, filed
on Oct. 27, 2022, provisional application No.
63/381,187, filed on Oct. 27, 2022.

(51) Int. Cl.
*A01D 41/127* (2006.01)
*A01D 41/12* (2006.01)

(52) U.S. Cl.
CPC ..... *A01D 41/1275* (2013.01); *A01D 41/1217*
(2013.01)

(58) Field of Classification Search
CPC ............ A01D 41/1275; A01D 41/1217; A01D
43/08; A01D 43/07; B65G 67/22
See application file for complete search history.

(56) References Cited

U.S. PATENT DOCUMENTS

| | | | |
|---|---|---|---|
| 8,060,283 B2 | 11/2011 | Mofl et al. | |
| 8,868,304 B2 | 10/2014 | Bonefas | |
| 9,119,342 B2 | 9/2015 | Bonefas | |
| 9,326,444 B2 | 5/2016 | Bonefas | |
| 9,642,305 B2 | 5/2017 | Nykamp et al. | |
| 9,861,040 B2 | 1/2018 | Bonefas | |
| 9,992,931 B2 | 6/2018 | Bonefas et al. | |
| 2010/0274452 A1* | 10/2010 | Ringwald | A01B 69/008 |
| | | | 701/50 |
| 2011/0307149 A1* | 12/2011 | Pighi | A01D 43/087 |
| | | | 700/218 |
| 2012/0215394 A1 | 8/2012 | Wang et al. | |
| 2014/0224377 A1 | 8/2014 | Bonefas | |

(Continued)

FOREIGN PATENT DOCUMENTS

| | | |
|---|---|---|
| CN | 108550141 A | 9/2018 |
| DE | 102009027245 A1 | 12/2010 |

(Continued)

OTHER PUBLICATIONS

John Deere, Active Fill Control Retrieved from internet on Jun. 27,
2023, 2 pages. <https://www.deere.com/en/technology-products/
precision-ag-technology/guidance/active-fill-control/>.

(Continued)

*Primary Examiner* — Navid Z. Mehdizadeh
*Assistant Examiner* — Caitlin R McCleary
(74) *Attorney, Agent, or Firm* — Christopher J.
Volkmann; KELLY, HOLT & CHRISTENSON PLLC

(57) ABSTRACT

A leading vehicle loads material into a receiving vehicle
during an unloading operation. The unloading operation
loads the receiving vehicle according to a multi-pass fill
pattern.

20 Claims, 16 Drawing Sheets

(56) References Cited

U.S. PATENT DOCUMENTS

| | | | |
|---|---|---|---|
| 2015/0264866 | A1 | 9/2015 | Foster et al. |
| 2017/0042088 | A1* | 2/2017 | Nykamp ............ A01D 41/1217 |
| 2017/0055446 | A1 | 3/2017 | Nykamp et al. |
| 2020/0039306 | A1 | 2/2020 | Rogan |
| 2020/0319655 | A1 | 10/2020 | Desai et al. |
| 2021/0127582 | A1* | 5/2021 | Burnley ............... A01D 43/073 |
| 2021/0195840 | A1 | 7/2021 | Puryk et al. |
| 2021/0294337 | A1 | 9/2021 | Van Mill et al. |
| 2021/0329840 | A1 | 10/2021 | Craig |
| 2021/0337729 | A1 | 11/2021 | O'Connor et al. |
| 2022/0015288 | A1 | 1/2022 | Christiansen et al. |
| 2022/0287239 | A1 | 9/2022 | Faust et al. |
| 2022/0410704 | A1 | 12/2022 | O'Connor et al. |

FOREIGN PATENT DOCUMENTS

| | | | |
|---|---|---|---|
| DE | 102012211001 | A1 | 1/2014 |
| EP | 1219153 | A2 | 7/2002 |
| EP | 2044826 | A2 | 4/2009 |
| EP | 2245917 | A2 | 11/2010 |
| EP | 2995191 | A1 | 3/2016 |
| EP | 3316218 | A1 | 5/2018 |
| EP | 3815486 | A1 | 5/2021 |
| EP | 3949714 | A1 | 2/2022 |
| EP | 3955183 | A1 | 2/2022 |
| EP | 4056019 | A1 | 9/2022 |
| EP | 4062740 | A1 | 9/2022 |
| EP | 4070636 | A1 | 10/2022 |
| EP | 4101286 | A1 | 12/2022 |
| WO | WO 2022036114 | A1 | 2/2022 |

OTHER PUBLICATIONS

John Deere, Machine Sync Retrieved from internet: Jun. 27, 2023, 3 pages. <https://www.deere.com/en/technology-products/precision-ag-technology/guidance/machine-sync/>.

U.S. Appl. No. 18/352,576 Application and Drawings filed on Jul. 14, 2023, 39 pages.

Huang. Xiaoshui & Mei, Guofeng & Zhang, Jian & Abbas, Rana, (2021). A comprehensive survey on point cloud registration, Mar. 5, 2021, 17 pages. Retrieved from internet: <https://www.researchgate.net/publication/349787695_A_comprehensive_survey_on_point_cloud_registration>.

U.S. Appl. No. 18/334,863 Application and Drawings filed on Jun. 14, 2023, 73 pages.

U.S. Appl. No. 18/334,869 Application and Drawings filed on Jun. 14, 2023, 85 pages.

U.S. Appl. No. 18/334,861 Application and Drawings filed on Jun. 14, 2023, 96 pages.

U.S. Appl. No. 18/334,874 Application and Drawings filed on Jun. 14, 2023, 59 pages.

U.S. Appl. No. 18/334,886 Application and Drawings filed on Jun. 14, 2023, 47 pages.

U.S. Appl. No. 18/465,580 Application and Drawings filed on Sep. 12, 2023, 114 pages.

U.S. Appl. No. 18/358,401 Application and Drawings filed on Jul. 25, 2023, 47 pages.

U.S. Appl. No. 18/471,701 Application and Drawings filed on Sep. 21, 2023, 50 pages.

Extended European Search Report and Written Opinion issued in European Patent Application No. 23202822.5, dated Mar. 19, 2024, in 07 pages.

Extended European Search Report and Written Opinion issued in European Patent Application No. 23203069.2, dated Mar. 18, 2024, in 07 pages.

Extended European Search Report and Written Opinion issued in European Patent Application No. 23203519.6, dated Mar. 14, 2024, in 05 pages.

Extended European Search Report and Written Opinion issued in European Patent Application No. 23203536.0, dated Mar. 14, 2024, in 06 pages.

Extended European Search Report and Written Opinion issued in European Patent Application No. 23203537.8, dated Mar. 14, 2024, in 05 pages.

Extended European Search Report and Written Opinion issued in European Patent Application No. 23202466.1, dated Mar. 26, 2024, in 07 pages.

Extended European Search Report and Written Opinion issued in European Patent Application No. 23202485.1, dated Mar. 26, 2024, in 07 pages.

Extended European Search Report and Written Opinion issued in European Patent Application No. 23203067.6, dated Mar. 26, 2024, in 11 pages.

Extended European Search Report and Written Opinion issued in European Patent Application No. 23202510.6, dated Apr. 4, 2024, in 08 pages.

Extended European Search Report and Written Opinion issued in European Patent Application No. 23202817.5, dated Apr. 23, 2024, in 08 pages.

Determine Volume of Solid, Oct. 16, 2019, 3 pages. https://knowledge.autodesk.com/support/autocad/learn-explore/caas/sfdcarticles/sfdcarticles/Determine-volume-of-solid.html#:~:text=To%20determine%20the%20volume%20of%20a%20solid%20object%2C%20use%20the,Press%20ENTER.

SolidWorks Calculating Volume of a Solid, Feb. 3, 2022, 6 pages. https://www.goengineer.com/blog/solidworks-calculating-volume-of-a-solid.

U.S. Appl. No. 63/381,178 Application and Drawings filed on Oct. 27, 2022, 101 pages.

U.S. Appl. No. 63/381,187 Application and Drawings filed on Oct. 27, 2022, 104 pages.

U.S. Appl. No. 63/512,368 Application and Drawings filed on Jul. 7, 2023, 101 pages.

https://teslamotorsclub.com/tmc/threads/lane-change-notification.252072/, dated Dec. 29, 2021, 4 pages.

* cited by examiner

MULTI PASS UNLOADING OPERATION

CROSS-REFERENCE TO RELATED APPLICATION

The present application is based on and claims the benefit of U.S. provisional patent application Ser. No. 63/512,368, filed Jul. 7, 2023, U.S. provisional patent application Ser. No. 63/381,178, filed Oct. 27, 2022, and U.S. provisional patent application Ser. No. 63/381,187, filed Oct. 27, 2022, the content of which is hereby incorporated by reference in its entirety.

FIELD OF THE DESCRIPTION

The present description generally relates to machines that load material into receiving vehicles, such as harvesting machines that fill carts, semitrailers, or other agricultural or other receiving vehicles. More specifically, but not by limitation, the present description relates to automated control of a fill-to-weight unloading operation.

BACKGROUND

There are a wide variety of different types of vehicles that load material into other vehicles. Some such vehicles include agricultural vehicles such as forage harvesters or other harvesters (such as combine harvesters, sugarcane harvesters, silage harvesters, etc.), that harvest grain or other crop. Such harvesters often unload material into carts, which may be pulled by tractors, or semitrailers, as the harvesters are moving. Other vehicles that unload material into receiving vehicles include construction vehicles, such as cold planers that unload into a dump truck, and other vehicles.

Taking an agricultural harvester as an example, while harvesting in a field using a forage harvester or combine harvester, an operator attempts to control the harvester to maintain harvesting efficiency, during many different types of conditions. The soil conditions, crop conditions, etc. can all change. This may result in the operator changing control settings. This means the operator needs to devote a relatively large amount of attention to controlling the forage harvester or combine harvester.

At the same time, a semitruck or tractor-pulled cart (a receiving vehicle), is often in position relative to the harvester (e.g., alongside the harvester or behind the harvester) so that the harvester can fill the semitrailer or cart, while moving through the field. In some current systems, this requires the operator of the harvester to control the position of the unloading spout and flap so that the truck or cart is filled evenly, but not over filled. Even a momentary misalignment between the spout and the truck or cart may result in hundreds of pounds of harvested material being dumped on the ground, rather than in the truck or cart.

The discussion above is merely provided for general background information and is not intended to be used as an aid in determining the scope of the claimed subject matter.

SUMMARY

A leading vehicle loads material into a receiving vehicle during an unloading operation. The unloading operation loads the receiving vehicle according to a multi-pass fill pattern.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
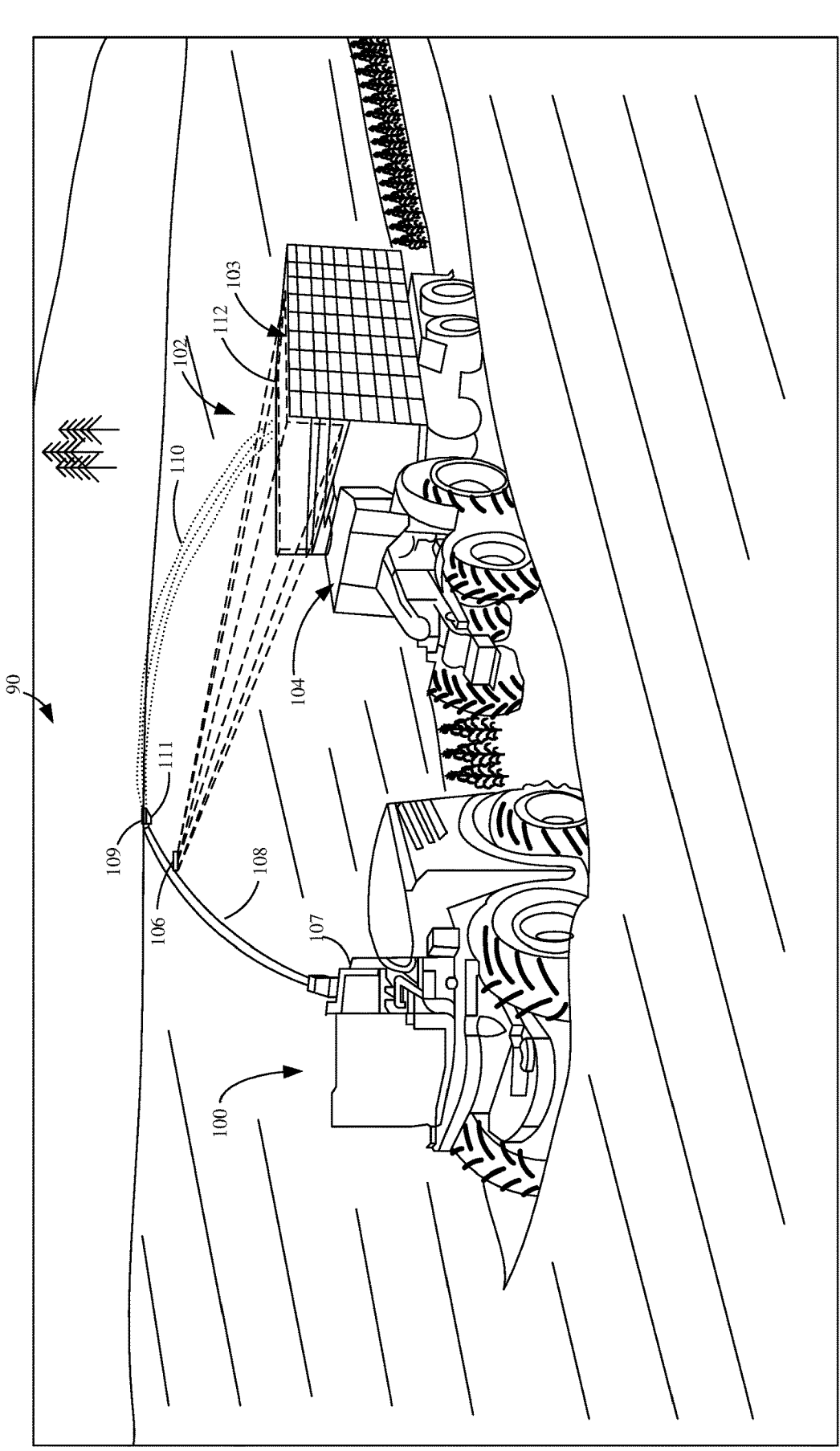
FIG. 1 is a pictorial illustration of one example of a forage harvester filling a tractor-pulled receiving vehicle, with the receiving vehicle following the forage harvester.

The present discussion proceeds with respect to an agricultural harvester, but it will be appreciated that the present discussion is also applicable to construction machines or other material loading vehicles as well. As discussed above, it can be very difficult for an operator to maintain high efficiency in controlling a harvester, and also to optimally monitor the position of the receiving vehicle during an unloading (or filling) operation. This difficulty can even be exacerbated when the receiving vehicle is located behind the harvester (such as a forage harvester), so that the forage harvester is executing a rear unloading operation, but the difficulty also exists in side-by-side unloading scenarios.

In order to address these issues, some automatic cart filling control systems have been developed to automate portions of the filling process. One such automatic fill control system uses a stereo camera on the spout of the harvester to capture an image of the receiving vehicle. An image processing system detects material height within the receiving vehicle, in order to automatically aim the spout toward empty spots and control the flap position (and thus material trajectory) to achieve a more even fill, while reducing spillage. Such systems can fill the receiving vehicle according to a fill strategy (such as front-to-back, back-to-front, etc.) that is set by the operator or that is set in other ways.

In addition, some current harvesters are provided with a machine synchronization control system. The harvester may, for instance, be a combine harvester so that the spout is not movable relative to the frame during normal unloading operations. Instead, the relative position of the receiving vehicle and the combine harvester is changed in order to fill the receiving vehicle as desired. Thus, in a front-to-back fill strategy, for instance, the relative position of the receiving vehicle, relative to the combine harvester, is changed so that the spout is first filling the receiving vehicle at the front end, and then gradually fills the receiving vehicle moving rearward. In such an example, the combine harvester and receiving vehicle may have machine synchronization systems which communicate with one another. When the relative position of the two vehicles is to change, the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vehicle that is currently being filled is approaching its desired fill level (fill height, fill weight, etc.). In that case, the machine synchronization system on the combine harvester can send a "nudge" signal to the machine synchronization system on the towing vehicle. The "nudge", once received by the machine synchronization system on the towing vehicle, causes the towing vehicle to automatically momentarily speed up or slow down, thus nudging the position of the receiving vehicle forward or rearward, respectively, relative to the combine harvester. By automatically it is meant, for example, that the operation is performed without further human involvement except, perhaps, to initiate or authorize the operation.

For purposes of the present discussion, the term leading vehicle will be the vehicle that is unloading material into the receiving vehicle. The term following vehicle will refer to the propulsion vehicle, or towing vehicle (such as a tractor), that is providing propulsion to the receiving vehicle (such as a cart).

In some current systems, the material is unloaded from the leading vehicle into the receiving vehicle according to a fill pattern, such as a front-to-back fill pattern or a back-to-front fill pattern. In the front-to-back fill pattern, the leading vehicle and the receiving vehicle are positioned relative to one another so that the material is first loaded into the receiving vehicle at a first landing point near the front portion of the receiving vehicle (in the direction of travel) to a desired fill level. Then, the following vehicle is nudged forward relative to the leading vehicle so that the next subsequent landing point of the material in the receiving vehicle is slightly rearward relative to the first landing point. When the material reaches a desired fill level at the subsequent landing point, the following vehicle is again nudged forward to move the subsequent landing point rearward in the receiving vehicle, and this continues until the receiving vehicle is filled to the desired fill level starting at the front of the receiving vehicle and moving toward the rear of the receiving vehicle.

In a back-to-front fill pattern, the fill pattern is opposite that of the front-to-back fill pattern. That is, the two vehicles are positioned relative to one another so that the initial landing point of the material in the receiving vehicle is at the rear of the receiving vehicle. When the material level at the initial landing point reaches the desired fill level, the following vehicle is nudged backward relative to the leading vehicle so that the next subsequent landing point in the receiving vehicle is just forward of the initial landing point. This continues until the receiving vehicle is filled to the desired fill level.

Both of these fill patterns have disadvantages. In the front-to-back fill pattern, a great deal of weight is initially placed over the draw bar which attaches the receiving vehicle to the following vehicle (e.g., to the tractor). This can break the drawbar, which is relatively expensive to replace or fix and which results in down time. In the back-to-front fill pattern, a great deal of weight is initially placed behind the axle of the receiving vehicle causing an upward moment to be exerted on the hitch point which tends to rotate the hitch point upward about the axle of the receiving vehicle. This can, in some cases, break the drawbar, or even lift the rear wheels of the following vehicle (e.g., the tractor) off the ground.

The present description thus proceeds with respect to a system that implements a fill pattern in which material is initially placed at an initial landing point that is generally over the axle (and perhaps just forward of the of the axle) of the receiving vehicle. The fill control system then performs a forward pass, in which material is filled (moving in the forward direction in the receiving vehicle) until the entire forward portion of the receiving vehicle is filled to a first pass target fill height. This places some weight over the draw bar, but that weight is, to some extent, counter balanced by the weight that has already been placed over the axle. Once the forward pass is complete, the unloading control system performs a second pass in which the receiving vehicle is filled with material to a desired final target fill height following a front-to-back fill pattern.

In one example, the initial landing point can be configurable by an operator. Thus, by the time significant weight is placed at the back of the receiving vehicle, that weight will be counterbalanced by the weight that has already been placed in the forward portion of receiving vehicle. In addition, the present system enforces a minimum nudge distance. Therefore instead of performing a large number of small nudges to fill the receiving vehicle, a minimum nudge distance is maintained which decreases the frequency of the nudge operations, thus reducing wear on the tractor and increasing the operator comfort for the operator of the following vehicle (the tractor). The present system can also implement a resumed filling operation which can be performed when the receiving vehicle is already partially filled by a previous unloading operation. The unloading control system performs the unloading operation to resume where the previous unloading operation finished without over filling the receiving vehicle.

FIG. 1 is a pictorial illustration showing one example of a self-propelled forage harvester 100 (a material loading vehicle also referred to as a leading vehicle) filling a tractor-pulled grain cart (or receiving vehicle) 102. Cart 102 thus defines an interior that forms a receiving vessel 103 for receiving harvested material through a receiving area 112. In the example shown in FIG. 1, a tractor 104 (a towing vehicle also referred to as a following vehicle), that is pulling grain cart 102, is positioned directly behind forage harvester 100 Also, in the example illustrated in FIG. 1, forage harvester 100 has a detector such as camera 106 mounted on the spout 108 through which the harvested material 110 is traveling. The spout 108 can be pivotally or rotatably mounted to a frame 107 of harvester 100. In the example shown in FIG. 1, the detector 106 is a stereo-camera or a mono-camera that captures an image (e.g., a still image or video) of the receiving area 112 of cart 102. Also, in the example shown in FIG. 1, the receiving area 112 is defined by an upper edge of the walls of cart 102.

When harvester 100 has an automatic fill control system that includes image processing, as discussed above, the automatic fill control system attempts to identify the location of the receiving area 112 by identifying the edges or walls of the receiving area and can then gauge the height of harvested material in cart 102, and the location of that material in the receiving vehicle. The system thus automatically controls the position of spout 108 and flap 109 to direct the trajectory of material 110 into the receiving area 112 of cart 102 to obtain an even fill throughout the entire length and width of cart 102, while not overfilling cart 102. By automatically, it is meant, for example, that the operation is performed without further human involvement except, perhaps, to initiate or authorize the operation.

For example, when executing a back-to-front automatic fill strategy the automatic fill control system may attempt to move the spout and flap or a machine synchronization system can position the vehicles relative to one another so the material begins landing at a first landing point in the back of vessel 103 of receiving vehicle 102. Then, once a desired fill level is reached in the back of vessel 103, the automatic fill control system moves the spout and flap or the machine synchronization system nudges the receiving vehicle to change the position of the vehicles relative to one another so the material begins landing just forward of the first landing point in vessel 103.

Also, cart 102 may have a scale that generates a weight signal indicative of a weight of material loaded into cart 102. The weight signal can be communicated to the automated fill control system to control the fill operation based on the weight signal and/or based on the fill level. This enables receiving vehicle 102 to be filled according to a desired fill pattern without exceeding weight restrictions or limitations on receiving vehicle 102.

Figure 2:
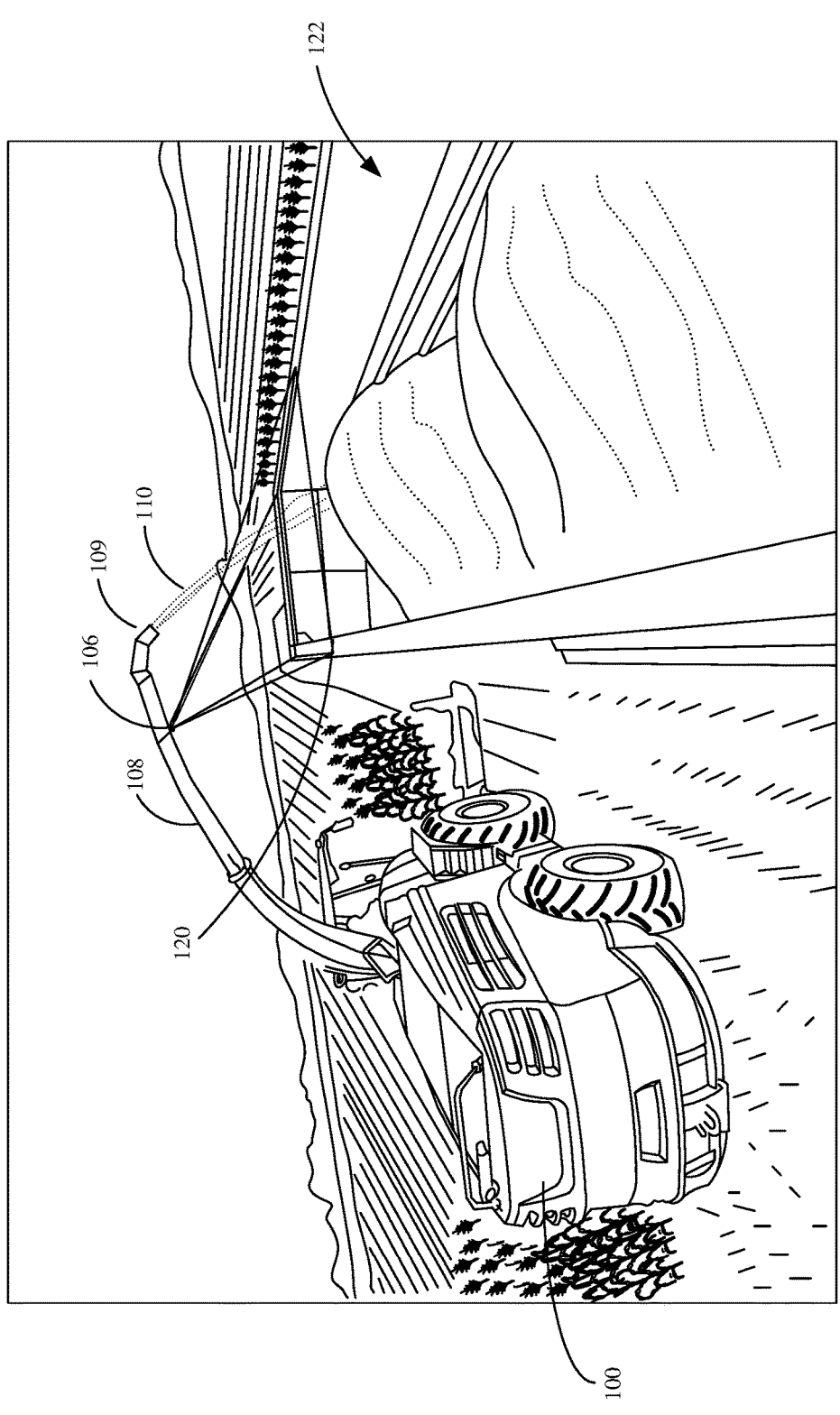
FIG. 2 is a pictorial illustration of one example of a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 122 in a configuration in which a semi-tractor (also referred to as a following vehicle) is pulling semi-trailer 122 alongside forage harvester 100. Therefore, the spout 108 and flap 109 are positioned to unload the harvested material 110 to fill trailer 122 according to a pre-defined side-by-side fill strategy. Again, FIG. 2 shows that camera 106 can capture an image (which can include a still image or video) of semi-trailer 122. In the example illustrated in FIG. 2, the field of view of camera 106 is directed toward the receiving area 120 of trailer 122 so that image processing can be performed to identify a landing point for the harvested material in trailer 122. A machine synchronization system can nudge the semi-trailer forward or rearward relative to harvester 100 to accomplish a fill strategy. Trailer 122 can also have a scale that sends a weight signal to the automated control system to control the unloading operation based on the weight signal.

Figure 3:
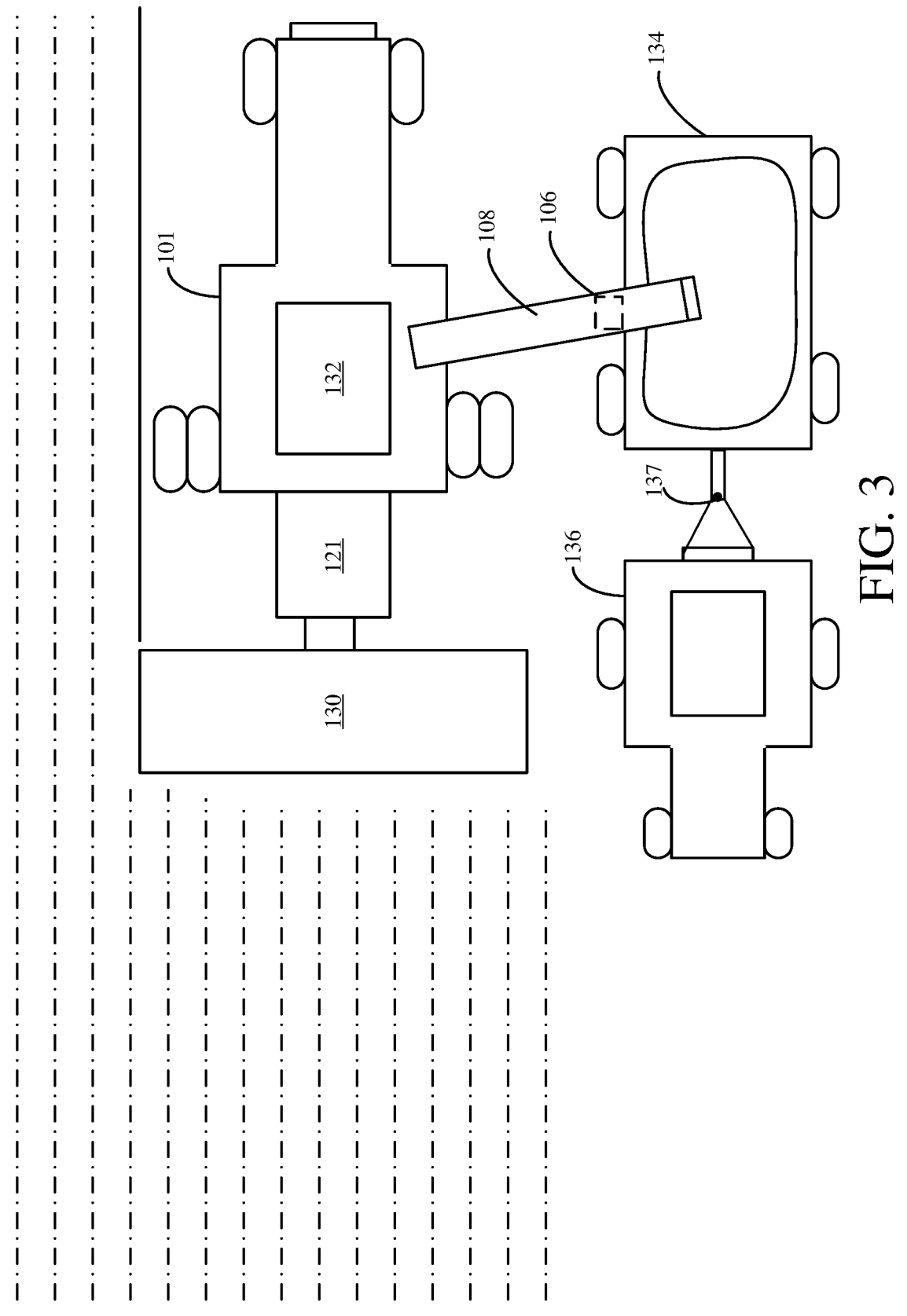
FIG. 3 shows a combine harvester filling a receiving vehicle.

FIG. 3 shows an example in which leading vehicle 101 is a combine harvester, with an operators compartment 121 and with a header 130 that engages crop. The crop is processed and placed in a clean grain tank 132, where it is unloaded (such as using an auger) through spout 108 into a receiving vehicle 134 (e.g., a grain cart) that is pulled by a following vehicle 136 (e.g., a tractor). FIG. 3 shows that receiving vehicle 134 is coupled to following vehicle 136 at a hitch point, or pivot point, 137. When harvester 101 is a combine harvester, it may be that the spout 108 is not moved relative to the frame of harvester 101 during normal unloading operations. Instead, the relative position of the receiving vehicle 134 and the combine harvester 101 is changed in order to fill the receiving vessel as desired. Thus, if a front-to-back fill strategy is to be employed, then the relative position of the receiving vessel in receiving vehicle 134, relative to the combine harvester 101, is changed so that the spout 108 is first filling the receiving vehicle 134 at the front end, and then gradually fills the receiving vessel moving rearward.

As with the examples shown in FIGS. 1 and 2, receiving vehicle 134 can have a scale that generates a weight signal. The automated system can control the unloading operation based on the weight signal alone or based on the weight signal in conjunction with other information, such as the height of material in the receiving material. The weight signal can be sent to the following vehicle 136 and then to the automated system (which may be on leading vehicle 101) or directly to the automated system. The weight signal can also be sent to a remote server and then to the loading vehicle 101. The communication channels can be wifi, cellular, and/or other communication channels.

Figure 4A:
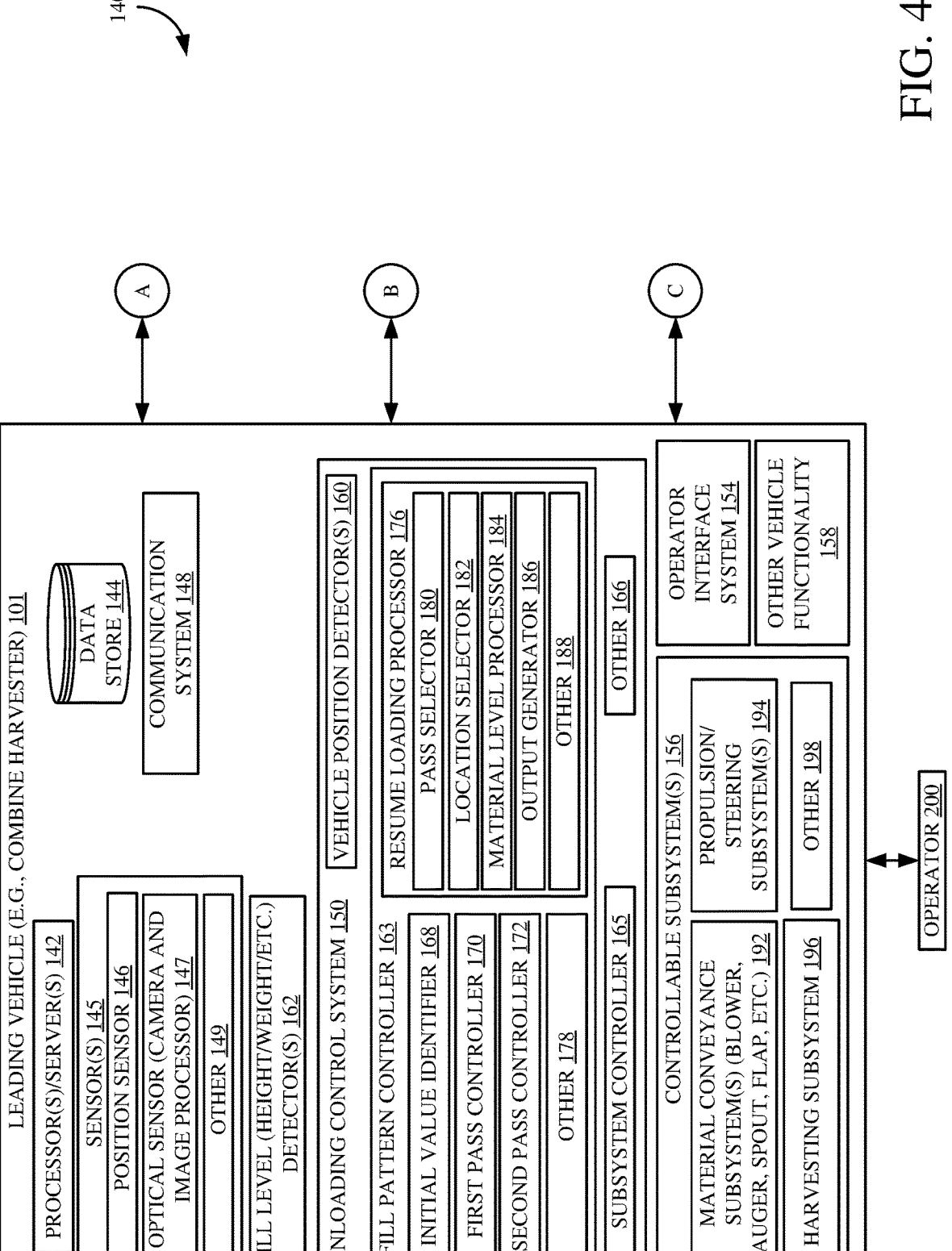
FIGS. 4A and 4B (collectively referred to as FIG. 4) show a block diagram of one example of an agricultural system.
Figure 4B:
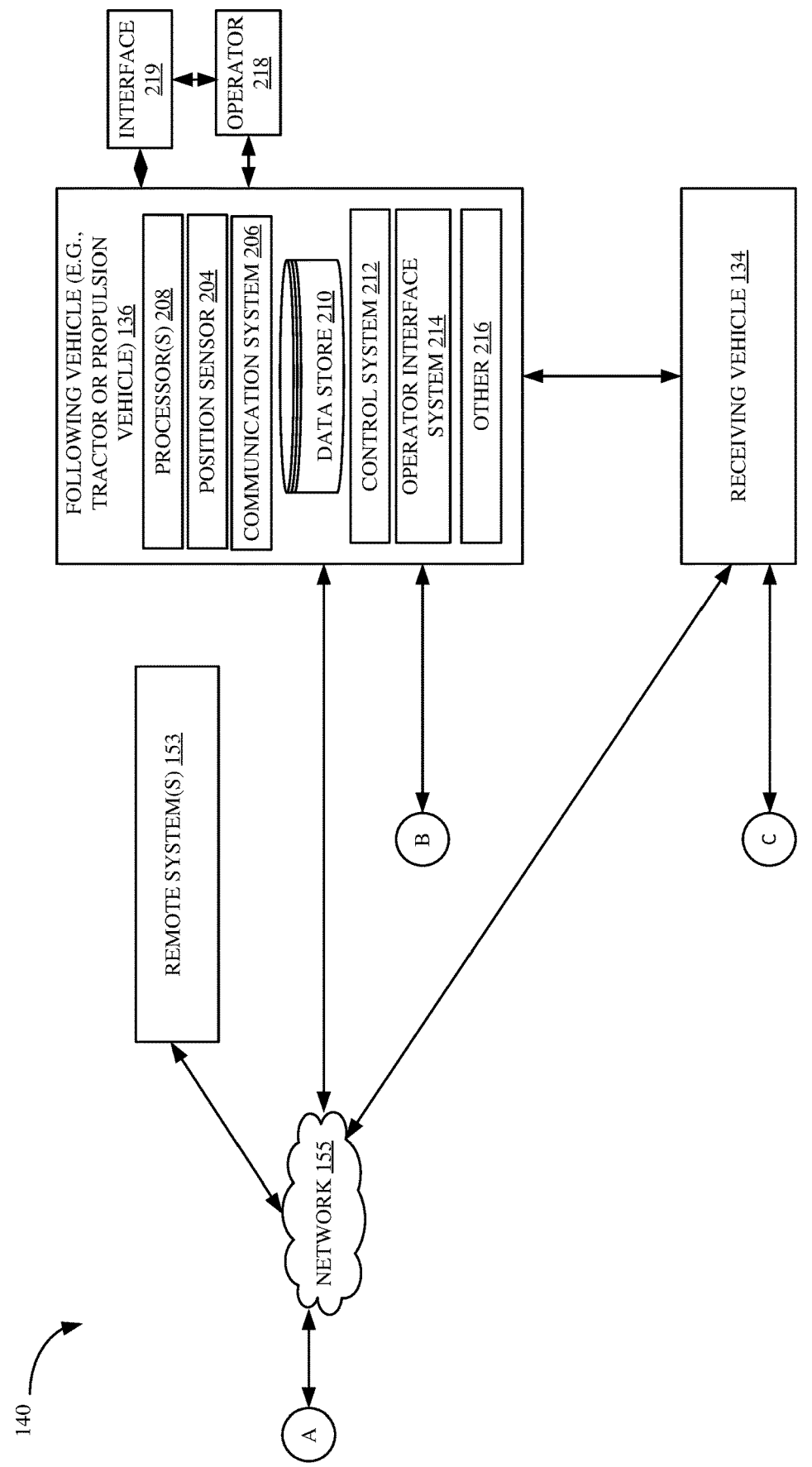

FIG. 4 shows a block diagram illustrating one example of an agricultural system 140 which includes leading vehicle (in the present example, a combine harvester) 101 which is followed by following vehicle (in the present example, a tractor or another propulsion vehicle) 136. Following vehicle 136 is pulling a receiving vehicle 134. It will be appreciated that while agricultural system 140 shown in FIG. 4 includes leading vehicle 101, following vehicle 136, and receiving vehicle 134 (e.g., the vehicles shown in the example illustrated in FIG. 3), other leading vehicles, following vehicles, and receiving vehicles can be used as well. The example shown in FIG. 4 is shown for the sake of example only.

FIG. 4 also shows that leading vehicle 101, following vehicle 136, and/or receiving vehicle 134 can communicate with one or more remote systems 153 (which can be a remote server environment, such as a vendor system, a manufacturer system, a farm manager system, a cloud-based system, or another system) over a network 155. Network 155 can be a wifi network, a cellular network, a Bluetooth network, a wide or local area network, or other network or combination of networks.

Leading vehicle 101 includes one or more processors or servers 142, data store 144, sensor(s) 145 (which can include optical sensor 147, position sensor 146, and other sensors 149), communication system 148, fill level (height/weight) detector(s) 162, unloading control system 150, operator interface system 154, controllable subsystems 156, and other vehicle functionality 158. Unloading control system 150 can include vehicle position detector(s) 160, subsystem controller 165, and other control system functionality 166. Vehicle position detector(s) 160 can include an optical sensor, a RADAR sensor, a LIDAR sensor, and/or other sensors. An optical sensor can include camera 106, an image processor, and/or other items. Fill pattern controller 163 can include initial value identifier 168, first pass controller 170, second pass controller 172, resume loading processor 176, and other items 178. Resume loading processor 176 can include pass selector 180, location selector 182, material level processor 184, output generator 186, and other items 188. Controllable subsystems 156 can include material conveyance subsystem (e.g., blower, auger, spout, flap, etc.) 192, propulsion/steering subsystem 194, harvesting subsystem 196, and/or other items 198. FIG. 4 also shows that leading vehicle 101 can be operated by an operator 200 by interacting with an operator interface and/or operator interface mechanism(s).

Following vehicle 136 can include position sensor 204, communication system 206, one or more processors or servers 208, data store 210, control system 212, operator interface system 214, and any of a wide variety other functionality 216. FIG. 4 also shows that following vehicle 136 may be operated by operator 218 who can interact with interfaces 219 (generated by operator interface system 214) and/or with other operator interface mechanisms.

Before describing the overall operation of agricultural system 140 in more detail, a description of some of the items in system 140, and their operation, will first be provided. Position sensor 146 can be a global navigation satellite system (GNSS) receiver, a dead reckoning system, a cellular triangulation system, or any of a wide variety of other systems that identify the coordinates or location of leading vehicle 101 in a global or local coordinate system. Optical sensor 147 can be a camera 106 or other optical sensor along with an image processing system. Data store 144 can store dimension information and orientation information, such as information that identifies the location and orientation of optical sensor 106 relative to the material conveyance system (e.g., blower, auger, spout, flap, etc.) 192. Data store 144 can store other information as well, such as volume profile information corresponding to receiving vehicle 134, an initial landing point, an initial fill height, a desired final fill height, a fill height buffer, a nudge size threshold, and other information.

Communication system 148 enables the communication of items on vehicle 101 with other items on vehicle 101, as well as communication with following vehicle 136, vehicle 134, remote system(s) 153, and/or other communication. Therefore, communication system 148 can be a controller area network (CAN) bus and bus controller, a cellular communication device, a wifi communication device, a local or wide area network communication device, a Bluetooth communication device, and/or any of a wide variety of devices or systems that enable communication over different types of networks or combinations of networks.

Fill level (height/weight, etc.) detector 162 can detect the fill level (e.g., the fill height or weight) of material in receiving vehicle 134. For instance, the fill level detector 162 can receive a signal from camera 106 and an image processing system that detects the level of material in receiving vehicle 134 relative to the top edge of receiving vehicle 134 and identify the fill height at the current landing point and at other points in receiving vehicle 134. Fill level detector 162 may receive a weight signal from scale on receiving vehicle 134 and identify the fill level of material in receiving vehicle 134 based on the weight signal and any estimated or measured density metric indicative of the density of the material. Fill level detector 162 can detect the fill level in other ways as well.

Unloading control system 150 controls the unloading process by which material conveyance subsystem 192 conveys material from leading vehicle 101 to receiving vehicle 134. Vehicle position detectors 160 sense parameters indicative of the position of the receiving vehicle 134. In the example discussed herein, detectors 160 can detect structural portions of receiving vehicle 134 that allow the location of the receiving area of receiving vehicle 134 to be determined. The structural portions, for example, may be the front wall or top front edge of the receiving vehicle 134, the side walls or top side edges of receiving vehicle 134, the rear wall or the top rear edge of receiving vehicle 134, etc. Therefore, vehicle position detectors 160 can include a camera 106 (or other camera(s)) and an image processor or other detectors. In other examples, vehicle position detector (s) 160 can include a RADAR sensor, and/or a LIDAR sensor, and/or other sensor(s). Such sensors can have signal processing systems that process the signals generated by RADAR and LIDAR sensors and/or other sensor(s) to identify the receiving vehicle parameters. Detector(s) 160 can include other sensors and processing systems as well.

Vehicle position detectors 160 can detect or derive the position of leading vehicle 101 and following vehicle 136 either in terms of absolute coordinates within a global or local coordinate system, or in terms of a relative position in which the positions of vehicles 101 and 136 are determined relative to one another. For instance, vehicle position detector(s) 160 can receive an input from position sensor 146 on vehicle 101 and from position sensor 204 (which may also be a GNSS receiver, etc.) on following vehicle 136 to determine where the two vehicles are located relative to one another. Vehicle position detector(s) 160 can then use known dimension information and/or kinematic information (which may, for instance, indicate the location and orientation of camera 106 or other detectors on the vehicles relative to known reference points on the vehicle or relative to the material conveyance subsystem 192, etc.) to detect the location of receiving vehicle 134 relative to the material conveyance subsystem 192. This location can then be used to determine how to control vehicles 101 and 136 to perform an unloading operation so that material conveyance subsystem 192 loads material into receiving vehicle 134 according to a desired fill pattern.

Fill pattern controller 163 generates control signals that can be used to control vehicle 101 and following vehicle 136 to accomplish the desired fill pattern. For instance, fill pattern controller 163 can generate control signals to control the material conveyance subsystem 192 to start or stop material conveyance, to control the spout position or flap position in order to control the trajectory of material that is being conveyed to receiving vehicle 134, and/or to control the propulsion/steering subsystem 194. Fill pattern controller 163 can also generate control signals that are sent by communication system 148 to the following vehicle 136 to "nudge" the following vehicle forward or rearward relative to leading vehicle 101, to instruct the operator 218 of following vehicle 136 to perform a desired operation, or to generate other control signals.

As one example, fill pattern controller 163 may receive an input from fill level detector 162 that is indicative of the fill level of material in receiving vehicle 134 at the current landing point in receiving vehicle 134. For instance, the fill level detector 162 can detect the fill level of material at the current landing point using camera 106 and an image processing system. When the fill level at the current landing point is within a threshold level of the top of receiving vehicle 134 (or another desired fill level), then a nudge may be issued to following vehicle 136 in order to move the position of the landing point where material is being conveyed to receiving vehicle 134 to a different landing point, in order to accomplish a desired fill pattern. As an example, in a front-to-back fill pattern, once the current landing point is at a desired fill level, then a nudge may be issued to move receiving vehicle 134 forward relative to material conveyance subsystem 192, to thus move the landing point rearward in receiving vehicle 134.

In accordance with one example, fill pattern controller 163 controls the fill pattern to initially fill material in the central portion of receiving vehicle 134, such as over its axle. Then, the fill pattern continues along a first pass by filling receiving vehicle 134 moving forward toward the front wall of receiving vehicle 134, to an initial target fill height which is perhaps one meter or some other height between the floor and the top edge of receiving vehicle 134. The first pass thus places weight on the hitch point 252, but the initial weight has been placed over the axle of receiving vehicle 134. Then, the fill pattern continues along a second pass by filling receiving vehicle 134 at the forward landing point to the final or desired target fill height (which may be within a threshold distance of the top of receiving vehicle 134), and then moving rearward performing a front-to-back fill pattern so that the receiving vehicle 134 is evenly filled to the desired or, final target fill height. This type of multi-pass filling operation enhances the stability of the vehicles by initially placing weight over the axle (or just forward of the axle) of the receiving vehicle 134 and then placing weight over the hitch point, and finally moving rearward to fill the receiving vehicle 134 to the final target fill height in the second front-to-back pass.

Subsystem controller 165 can generate control signals to control any desired controllable subsystems 156, communication system 148, etc. As mentioned, operator interface system 154 can generate interfaces for operator 200 and receive inputs from operator 200. Therefore, operator interface system 154 can include interface mechanisms such as a steering wheel, joysticks, pedals, buttons, displays, levers, linkages, etc. Interfaces can be generated for interaction by operator 200, such as on a display screen, a touch sensitive display screen, or in other ways. Operator interface system 154 can detect operator interactions with the displayed interface, such as the operator actuating icons, links, buttons, etc. Operator 200 can interact with the interface(s) using a keyboard or keypad, a point and click device, touch gestures, speech commands (where speech recognition and/or speech synthesis are provided), or in other ways.

On following vehicle 136, position sensor 204 may be a global navigation satellite system (GNSS) receiver, a dead reckoning system, a cellular triangulation system, or any of a wide variety of other systems that provide coordinates of following vehicle 136 in a global or local coordinate system, or that provide an output indicating the position of following vehicle 136 relative to a reference point (such as relative to leading vehicle 101), etc. Communication system 206 allows the communication of items on vehicle 136 with one another, and also provides for communication with leading vehicle 101, receiving vehicle 134, remote system(s) 153, and/or other systems. Therefore, communication system 206 can be similar to communication system 148 discussed above, or different. It will be assumed for the purpose of the present discussion that communication systems 148 and 206 are similar, although this is for the sake of example only. Data store 210 can store dimension data which identify different dimensions of following vehicle 136, the location and/or orientation of different sensors on vehicle 136, kinematic information describing vehicle 134 and/or vehicle 136, and other information. Control system 212 can be used to receive inputs and generate control signals. The control signals can be used to control communication system 206, operator interface system 214, data store 210, the propulsion and/or steering subsystem on following vehicle 136, other controllable subsystems, and/or other items. Operator interface system 214 can also include an interface generator that can generate interfaces 219. Operator interface system 214 can also include operator interface mechanisms such as a steering wheel, joysticks, buttons, levers, pedals, linkages, etc. Operator interface system 214 can also include a display screen that can be used to display operator interfaces 219 for interaction by operator 218. Operator 218 can interact with the operator interfaces using a point and click device, touch gestures, voice commands, etc.

Network 155 may be a wide area network, a local area network, a near field communication network, a wifi communication network, a cellular communication network, a Bluetooth communication network, or any of a wide variety of other networks or combinations of networks. Therefore, any of the communication systems in system 140 may be configured to communicate over network 155. A data store on remote system(s) 153 can store volume profile information for different receiving vehicles, any of the initial values discussed above, among other things.

Figures 5A, 5B, 5C:
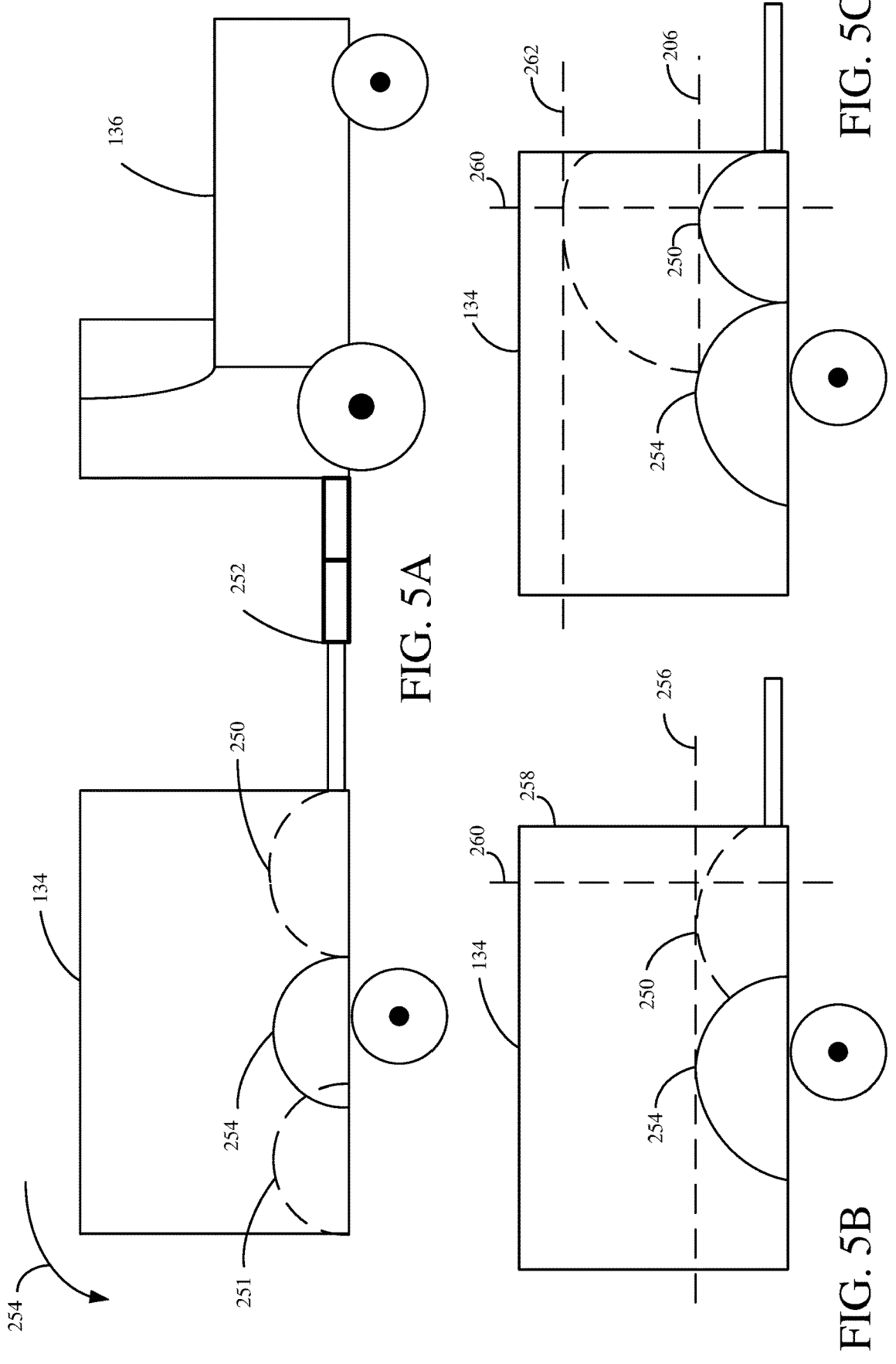
FIGS. 5A, 5B, 5C, 5D, and 5E show side view illustrations of a receiving vehicle and fill pattern(s).

One example of a fill pattern is now described with respect to FIGS. 5A-5D. FIG. 5A is a pictorial illustration of one example of a receiving vehicle 134 and following vehicle (e.g., tractor) 136. In the example shown in FIG. 5A, three different initial landing points are identified to show where the unloading operation can begin. In accordance with one initial landing point the material is initially loaded at a front location 250. In that case, as the material level increases, the weight on the hitch point 252 of vehicle 136 and receiving vehicle 134 increases. If the weight is sufficient, the structure forming the hitch point 252 (e.g., the hitch bar of vehicle 134 and/or draw bar of vehicle 136) may actually break. In another example, the initial landing point could be the point indicated at 252 in FIG. 5A, toward the rear of receiving vehicle 134. As the level of material at landing point 252 increases, the weight can increase thus inducing a moment about the axle of receiving vehicle 134 generally in the direction indicated by arrow 254. This can cause an upward force to be exerted on the hitch point 252. When the weight is sufficient, this can break the structures forming to hitch point 252 or lift the rear wheels of vehicle 136 off the ground.

Therefore, in accordance with one example, the initial landing point is set to be at or near landing point 254, over the axle (or just forward of the axle) of vehicle 134. The receiving vehicle 134 is filled to an initial target fill level at landing point 254, and vehicle 136 is then nudge rearwardly relative to leading vehicle 101 so that the landing point moves forward in receiving vehicle 134. FIG. 5B shows one example of this. In FIG. 5B, it can be seen that material has been filled at initial landing point 254 to an initial target fill level 256. Then, the vehicle 136 is nudged rearwardly so that the next subsequent landing point is generally at landing point 250, closer to the front of receiving vehicle 136. It will be noted that, in one example, a deadband zone is set relative to the front wall 258 of receiving vehicle 134. The deadband zone is illustrated by dashed line 260 and identifies a boundary that is spaced (by a predefined or configurable distance) from front wall 258 across which the landing point will not be moved. The landing point will be no closer to front wall 258 than the boundary identified by deadband 260. This helps to avoid accidental material spillage forward of the front wall 258 during the fill operation.

Figure 5E:
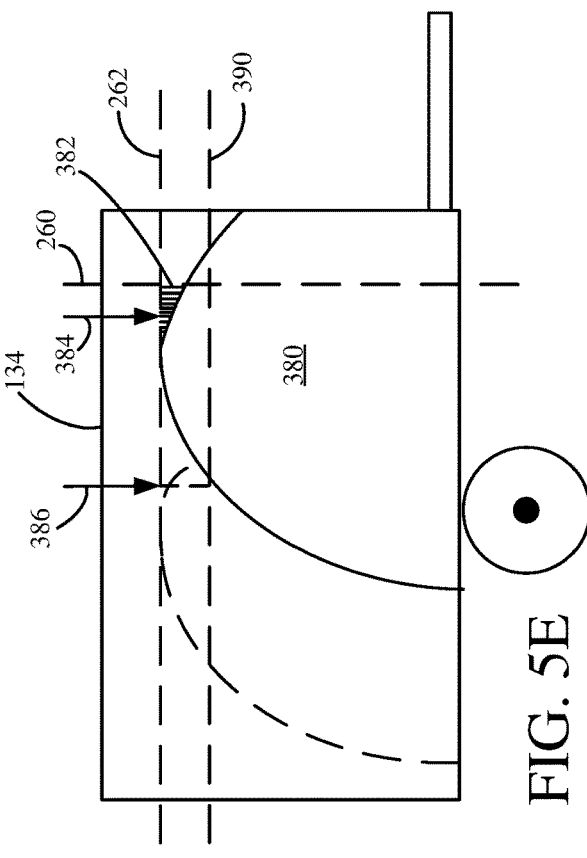
Figure 5D:
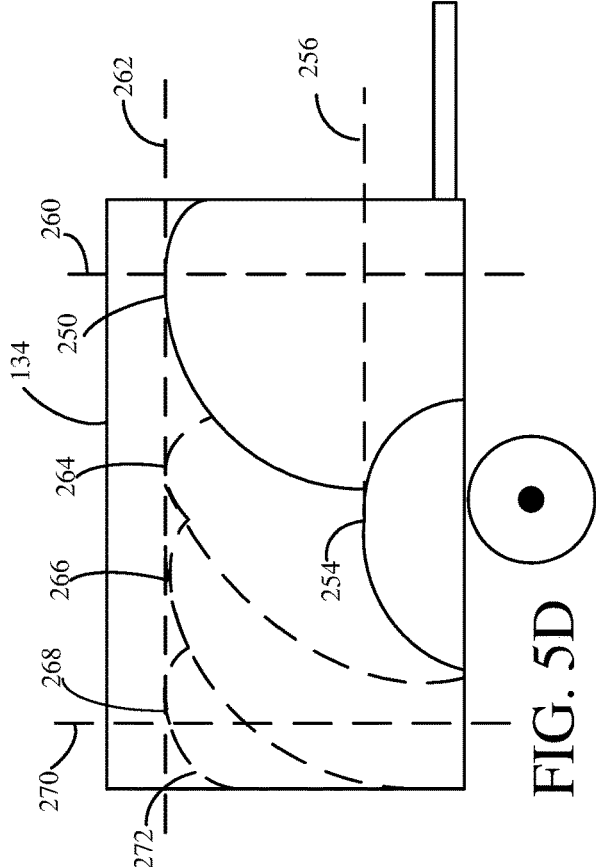

When landing point 250 is the forward-most landing point, the fill operation continues at landing point 250 until material is filled to a final target fill level. One example of this filling operation is illustrated in FIG. 5C. FIG. 5C shows that material has now been loaded into receiving vehicle 134 to the initial target fill height 256 from the initial landing point 254 all the way forward to the deadband location 260. The unloading operation then continues at landing point 250 until the material reaches a final or desired target fill height as indicated by the dashed line 262. Once the material reaches the final target fill height 262 at location 250, then vehicle 136 is nudged forward relative to leading vehicle 101 so that the landing point moves rearwardly in receiving vehicle 134. FIG. 5D shows an example of this.

FIG. 5D shows that the material at landing point 250 has now reached the final or desired target fill height 262. Thus, vehicle 136 is nudged forward relative to leading vehicle 101 so that the next subsequent landing point is landing point 264. This continues so that once material at landing point 264 reaches the desired target fill height 262, receiving vehicle 136 is again nudged forward so that the next subsequent landing point is landing point 266. Again, when the material at landing point 266 reaches desired target fill height 264, receiving vehicle 136 is again nudged forward so that the next subsequent landing point is landing point 268. This continues until the material at the different landing points in receiving vehicle 134 is loaded to the final target fill height 262. Again, a deadband 270 for the rear wall 272 of receiving vehicle 134 may be used so that the landing point where material is filled into receiving vehicle 134 stays between deadbands 260 and 270 to avoid spillage of material rearward of wall 272.

Referring again to FIG. 4, initial value identifier 168 identifies the initial values that are needed to load material according to a fill pattern. For instance, the initial value identifier may identify such things as the initial landing point (e.g., 254 in FIG. 5A), the initial target fill height (e.g., 256 in FIG. 5B), the desired, final target fill height (e.g., 262 in FIG. 5C), a fill height buffer (which is described in greater detail below), a nudge size threshold (which is also described in greater detail below), and/or a wide variety of other initial values. In one example, initial value identifier 168 receives the initial values through an operator input. In another example, the initial values can be obtained from data store 144 or other locations.

First pass controller 170 then controls the unloading operation to perform the first pass (such as the forward pass described above with respect to FIGS. 5A-5D. Second pass controller 172 controls the unloading operation to perform the second pass (such as the rearward pass described above with respect to FIGS. 5A-5D).

It may happen that, prior to beginning an unloading operation, it is determined that receiving vehicle 134 has already been partially filled by a previous unloading operation (such as from a different harvester). In that case, resume loading processor 176 identifies an initial landing point where vehicle 101 can resume filling receiving vehicle 134. Processor 176 thus attempts to identify where, in the multi-pass unloading operation, the previous operation finished. Pass selector 180 identifies the pass that the previous leading vehicle was on when it finished unloading. Location selector 182 identifies the landing point in receiving vehicle 134 where the current unloading operation is to resume filling receiving vehicle 134. For example, it may be that the previous unloading operation finished part way through the first, forward pass or partially through the second, rearward pass. By determining the fill level at different points in receiving vehicle 134, pass selector 180 can determine which pass to resume. Also, by detecting the fill levels, location selector 182 can identify the landing point (on the first or second pass) where unloading is to resume. Material level processor 184 identifies the level of material in receiving vehicle 134 and provides that level to pass selector 180 and location selector 182 to determine where the unloading operation should resume and output generator 186 generates an output identifying where the unloading operation is to resume, and which pass is to be resumed. For instance, if the unloading operation is to resume at location 250 (shown above with respect to FIGS. 5B-5D) then output generator 186 outputs the landing point location 250 along with the pass (e.g., whether the unloading operation should commence filling and continue the forward pass or the rearward pass). That information can be output to first pass controller 170 or second pass controller 172 to resume loading the receiving vehicle 134 at a desired location and on a desired pass.

Figure 6A:
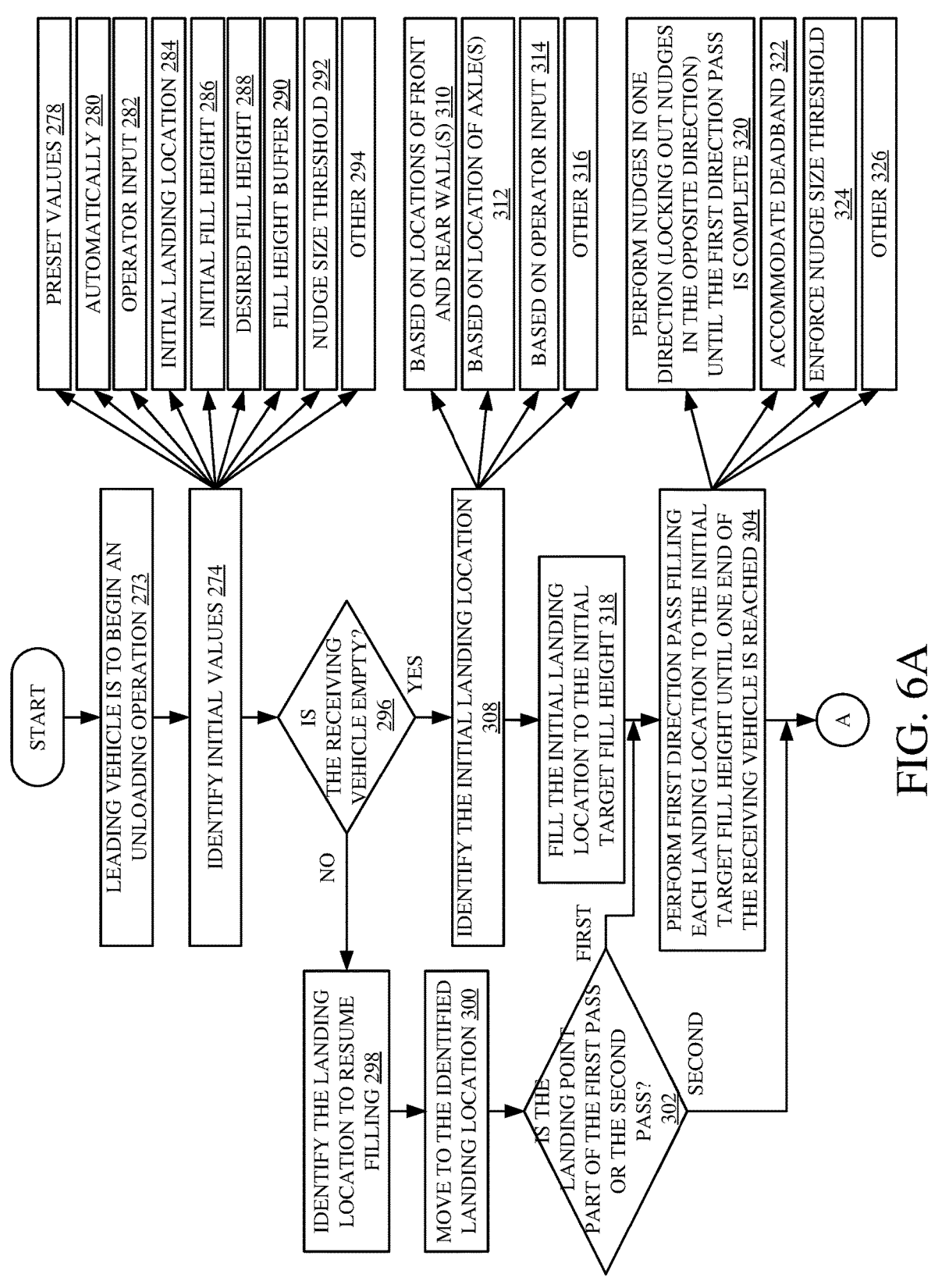
FIGS. 6A and 6B (collectively referred to as FIG. 6) show a flow diagram showing one example of controlling an unloading operation.
Figure 6B:
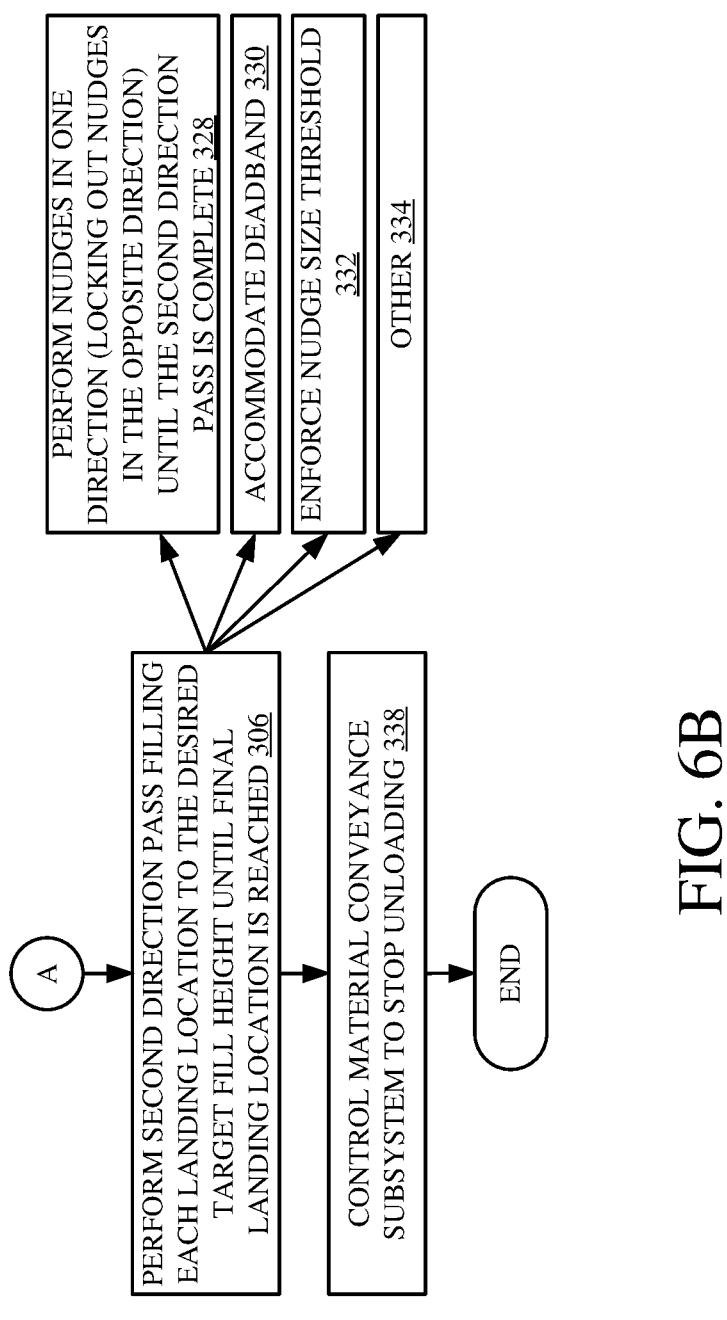

FIG. 6 is a flow diagram illustrating one example of the operation of agricultural system 140 in performing a multi-pass fill operation. It is first assumed that leading vehicle 101 is to begin performing an unloading operation to unload material into receiving vehicle 134, as indicated by block 273. Initial value identifier 168 then identifies initial values that will be used in performing the unloading operation. Identifying initial values is indicated by block 274 in the flow diagram of FIG. 6. Some or all of the initial values may be preset of default values, as indicated by block 278. The initial values may be obtained automatically as indicated by block 280 or through operator inputs as indicated by block 282. The initial values may include such things as the initial landing location 284 that identifies the landing point in receiving vehicle 134 where the unloading operation is to begin. The initial values may include an initial target fill height 286 for the forward pass (such as initial target fill height 256 shown in FIGS. 5A-5D). The initial values may include the desired or final target fill height 288 (such as fill height 262 shown in FIGS. 5C and 5D), a fill height buffer 290 which identifies a height below the desired final target fill height 262, and a nudge size threshold 292 which identifies the minimum distance between landing points during the fill operation. The initial values can include a wide variety of other values 294 as well.

At block 296, fill level detector 162 determines whether the receiving vehicle is empty, or partially filled. If receiving vehicle 134 is partially filled, then resume loading processor 176 identifies the landing location and pass to resume unloading material into receiving vehicle 134, as indicated by block 298. Fill pattern controller 163 controls movement of the two vehicles relative to one another so that the material conveyance subsystem 192 is positioned to begin loading material into receiving vehicle 134 at the identified landing location, as indicated by block 300. If leading vehicle 101 is to resume unloading material into receiving vehicle 134 according to the first pass, as determined at block 302, then processing moves to block 304 where the first pass is resumed. However, if leading vehicle 101 is to resume loading receiving vehicle 134 according to the second pass, then processing jumps to block 306 where the second pass is resumed.

Assume, at block 296, that fill level detector 162 determines that the receiving vehicle 134 is empty. Then, initial value identifier 168 identifies the initial landing point where the unloading operation is to commence, as indicated by block 308 in the flow diagram of FIG. 6. The initial landing point can, as discussed above, be automatically determined as a location between, and offset from, the front and rear walls of receiving vehicle 134, as indicated by block 310. In another example, the initial landing point may be identified based upon the location of the axle of receiving vehicle 134 (which may be obtained from dimension information, kinematic information, or other information that corresponds to receiving vehicle 134). Determining the initial landing point based upon the location of the axle of receiving vehicle 134 is indicated by block 312 in the flow diagram of FIG. 6. The initial landing point may be determined based upon an operator input, as indicated by block 314. For instance, in one example, a graphical user interface may be displayed for operator 200 or for operator 218. The graphical user interface May display actuatable user input mechanisms which allow the operator to set the initial landing point for the unloading operation. For instance, the graphical user interface may include a pictorial illustration of receiving vehicle 134 and allow the operator to specify the location in receiving vehicle 134 corresponding to the initial landing point using a touch gesture or another input. In another example, the graphical user interface may include a movable element (e.g., a slider) that is movable along an axis corresponding to the front-to-back axis of receiving vehicle 134. The movable element may be a slidable thumb, a numerical value with "+" and "−" actuators, or another indicator that can be used to select the initial landing point. The initial landing point can be identified in a wide variety of other ways as well, as indicated by block 316 in the flow diagram of FIG. 6.

Once the initial landing point is identified, then first pass controller 170 controls the unloading operation to fill the initial landing location to the initial target fill height, as indicated by block 318 in the flow diagram of FIG. 6. For instance, as shown in FIG. 5B, first pass controller 170 controls the unloading operation to fill the initial fill location 254 to the initial target fill height 256. Once the initial landing location is filled to the initial target fill height, then first pass controller 170 performs an unloading pass in the first direction (e.g., toward the front wall 258 of receiving vehicle 134) nudging the vehicle 136 backward relative to the leading vehicle 101 to fill each subsequent landing point to the initial target fill height 256 until the front wall 258 (or the deadband 260) is reached, as indicated by block 304 in the flow diagram of FIG. 6. In performing the first pass, first pass controller 170 controls the nudges so that the nudges are only performed in one direction (e.g., vehicle 136 is only nudged rearward relative to leading vehicle 101 during the first pass) until the entire first pass is completed. For instance, during the fill operation, the material in the receiving vehicle may settle so that material at a landing point behind the current landing point (in the direction of the first pass) may fall below the desired fill level. The system will not re-visit that landing point, because it is in the opposite direction of the current pass. This inhibits the following vehicle being nudged in opposite directions during a given pass. Performing nudges in one direction during the first pass is indicated by block 320 in the flow diagram of FIG. 6. Accommodating the deadband 260 so that the unloading operation does not perform unloading at a landing point forward of the deadband 260 is indicated by block 322 in the flow diagram of FIG. 6. Also, in one example, a minimum nudge size or nudge threshold is set so that a next subsequent landing point is at least a threshold distance from the current landing point. The frequency of the nudge operations is governed by the minimum nudge size threshold. Setting a smaller nudge size threshold means that more nudges will be performed more often during unloading. This can lead to a more even fill of receiving vehicle 134 but also reduced comfort for operator 218 and more wear on vehicle 136. Setting a larger nudge size threshold means fewer and less frequent nudges will be performed. Allowing a configurable nudge size threshold can ensure that the receiving vehicle 134 will be filled relatively uniformly, but the comfort of the operator of following vehicle 136 is also accommodated because the nudge operations will not be performed too frequently. In one example, for instance, the nudge threshold is set to 60 cm. Therefore, even though the fill level detector 162 detects that a landing point 30 cm from the current landing point is not filled to the desired target fill level, the next landing point will be set 60 cm away from the current landing point. Enforcing the nudge size threshold is indicated by block 324 in the flow diagram of FIG. 6.

As one example, assume that first pass controller 170 determines that the current landing point is at, or is approaching, the initial target fill level. First pass controller 170 will then identify the next subsequent landing point adjacent the current landing point where the fill level is below the fill level (or first pass target fill level) 256. First pass controller 170 will then set the next subsequent landing point to be at that identified point within receiving vehicle 134 so that vehicle 136 can be nudged rearwardly until material is being filled at the next subsequent landing point. However, in such an example, a minimum nudge size threshold may be enforced. Assume, for instance, that a minimum nudge size is 60 cm. In that case, even if first pass controller 170 identifies the next subsequent landing point as being 40 cm away from the current landing point first pass controller 170 compares the distance between the current landing point and the identified landing point (40 cm) to the nudge size threshold (60 cm) and sets the nudge size to the larger of the two. The nudge size will thus be set to 60 cm so that the next subsequent landing point will be 60 cm away from the current landing point. First pass controller 170 controls the unloading operation so that vehicle 136 is nudged rearward relative to leading vehicle 101 by a distance of 60 cm (instead of 40 cm). Enforcing such a minimum nudge size threshold not only improves the comfort of the operator of vehicle 136, but it also ensures that receiving vehicle 134 is filled relatively evenly.

First pass controller 170 can control the unloading operation to perform the first pass in other ways as well, as indicated by block 326.

Once the first pass is completed (as shown in FIG. 5C), then second pass controller 172 begins controlling the unloading operation to perform the second pass (which, in the example described herein, is a front-to-back pass). Thus, second pass controller 172 continues filling receiving vehicle 134 at the forward-most landing point 250 (shown in FIG. 5C) until the material reaches the desired final fill height 262, at which point second pass controller 172 identifies a next subsequent landing point (rearward of the current landing point in receiving vehicle 134) where the material fill level has not yet reached the final target fill level 262. Second pass controller 172 then controls the unloading operation so that vehicle 136 is nudged forward relative to leading vehicle 101 to position the material conveyance subsystem 192 so that it is now unloading at the next subsequent landing point located rearward of the current landing point. As an example, and referring to FIG. 5D, once the landing point 250 is loaded sufficiently that the material height reaches the final target fill level 262, then the next landing point 264 is identified and the vehicles are nudged relative to one another to continue loading at landing point 264. Performing the second pass, filling each landing point to the final target fill height is indicated by block 306 in the flow diagram of FIG. 6. This continues until all identified landing points in receiving vehicle 134 are filled to the desired fill height 262.

Again, as with first pass controller 170, second pass controller 172 controls the unloading operation so that nudges are only performed in one direction during the second pass. Nudges in the opposite direction are locked out until the second direction pass is complete. This avoids nudging vehicle 136 forward and then rearward, and then forward, etc. Performing nudges in one direction until the second pass is complete is indicated by block 328 in the flow diagram of FIG. 6. Also, second pass controller 172 can accommodate the deadband 270 to avoid inadvertently spilling material over the rear wall 272 of receiving vehicle 134. Accommodating deadband 270 is indicated by block 330 in the flow diagram of FIG. 6. Second pass controller 172 can also enforce the minimum nudge size threshold to ensure that the frequency of the nudge operations is not undesirably high but to still fill receiving vehicle 136 uniformly, as indicated by block 332 in the flow diagram of FIG. 6. Second pass controller 172 can control the second pass in other ways as well, as indicated by block 334.

When the second pass is complete, then subsystem controller 165 controls the material conveyance subsystem 192 to stop unloading material, as indicated by block 338 in the flow diagram of FIG. 6.

Figure 7:
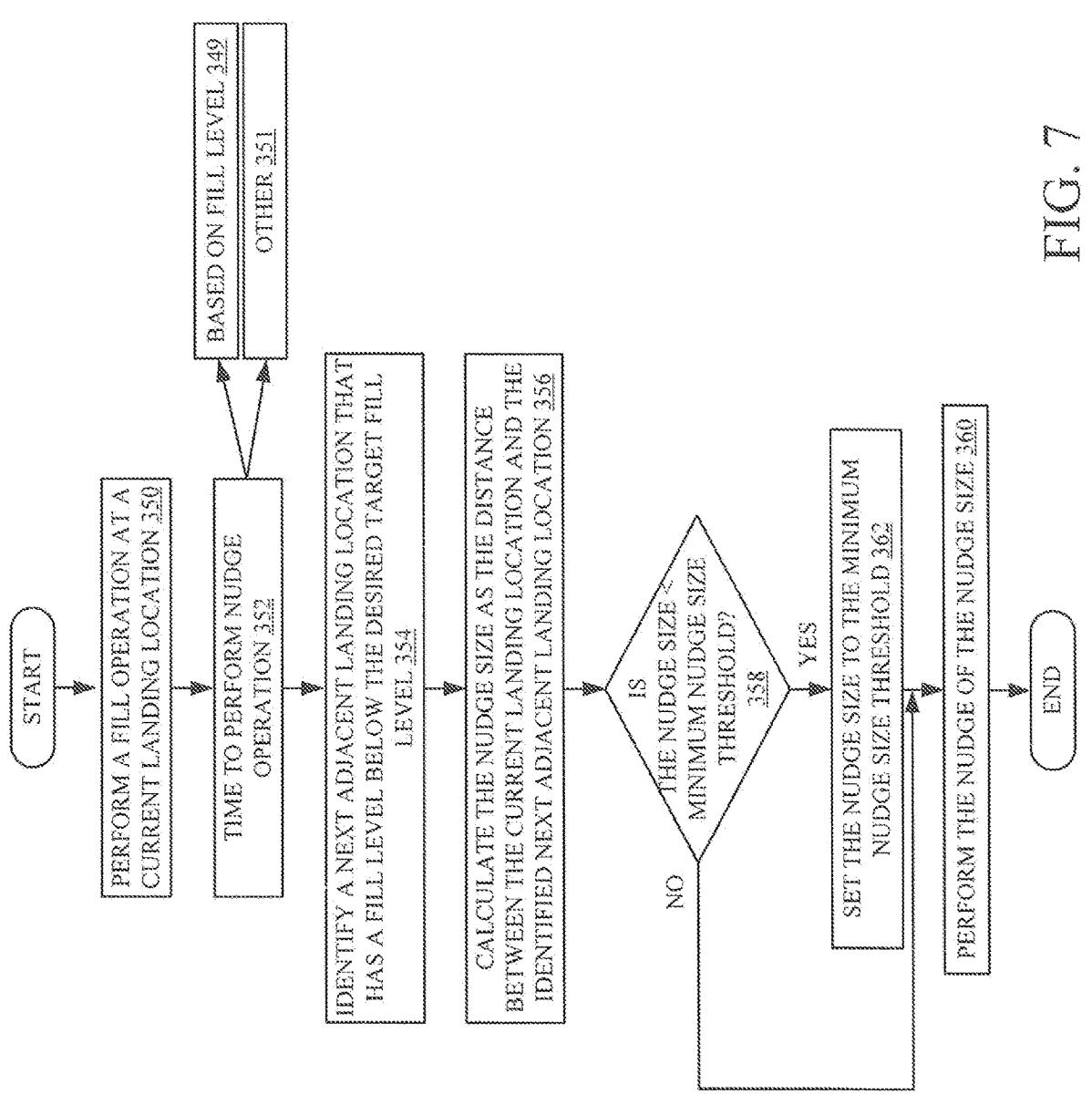
FIG. 7 is a flow diagram showing one example of controlling an unloading operation to perform a pass.

FIG. 7 is a flow diagram shown one example of the operation of fill pattern controller 163 in controlling the fill operation according to a fill pattern. For instance, FIG. 7 shows one example of how first pass controller 170 can perform the first pass in filling receiving vehicle 134 and/or how second pass controller 172 can perform the second pass in filling receiving vehicle 134. It is first assumed that a fill operation is being performed at a current landing point within receiving vehicle 134. In such an example, fill pattern controller 163 is generating control signals that can be used to control material conveyance subsystems 192 and to nudge following vehicle 136 forward or rearward with respect to leading vehicle 101. Performing a fill operation at a current landing point is indicated by block 350 in the flow diagram of FIG. 7.

For purposes of the present description, it will be assumed that FIG. 7 describes the operation of second pass controller 172 performing the second pass (the front-to-back pass) in filling receiving vehicle 134. Thus, at some point, fill level detector 162 detects that the fill level at the current landing point in receiving vehicle 134 has reached the desired target fill level 262. Second pass controller 172 then determines that it is time to perform a nudge operation commanding following vehicle 136 to move forward relative to leading vehicle 101. Determining that it is time to perform a nudge operation is indicated by block 352 in the flow diagram of FIG. 7.

Second pass controller 172 then identifies a next subsequent landing point adjacent the current landing point in receiving vehicle 134 (in the direction of the second pass) where the material fill level is below the desired target fill level 262. For instance, fill level detector 162 can process an image of the receiving vehicle 134 to identify a landing point in receiving vehicle 134, closest to the current landing point but spaced from the current landing point in the direction of the second pass (in the front-to-rear direction), where the fill level is below the desired target fill level 262. Identifying the next subsequent landing point in receiving vehicle 134 where the target fill level is below the desired fill level 262 is indicated by block 354 in the flow diagram of FIG. 7.

Second pass controller 172 then calculates the distance between the current landing point and the next subsequent landing point to determine the distance of the nudge operation (e.g., the distance by which following vehicle 136 is to be nudged forward relative to leading vehicle 101). Calculating the nudge size in this way is indicated by block 356 in the flow diagram of FIG. 7. Second pass controller 172 then compares the calculated nudge size to the minimum nudge size threshold, as indicated by block 358 in the flow diagram of FIG. 7. If the calculated nudge size meets the minimum nudge size threshold, then processing continues at block 360 where second pass controller 172 generates control signals to nudge vehicle 136 by the calculated nudge size. However, if, at block 358, second pass controller 172 determines that the calculated nudge size is less than the minimum nudge size threshold, then the nudge size is set to the minimum nudge size threshold, as indicated by block 362 in the flow diagram of FIG. 7, and the nudge is then performed to nudge vehicle 136 by the nudge size threshold, as indicated by block 360. During the pass, the pass controller also enforces the deadbands 260 and 270 so that no landing points in the deadband zones are selected.

Figure 8:
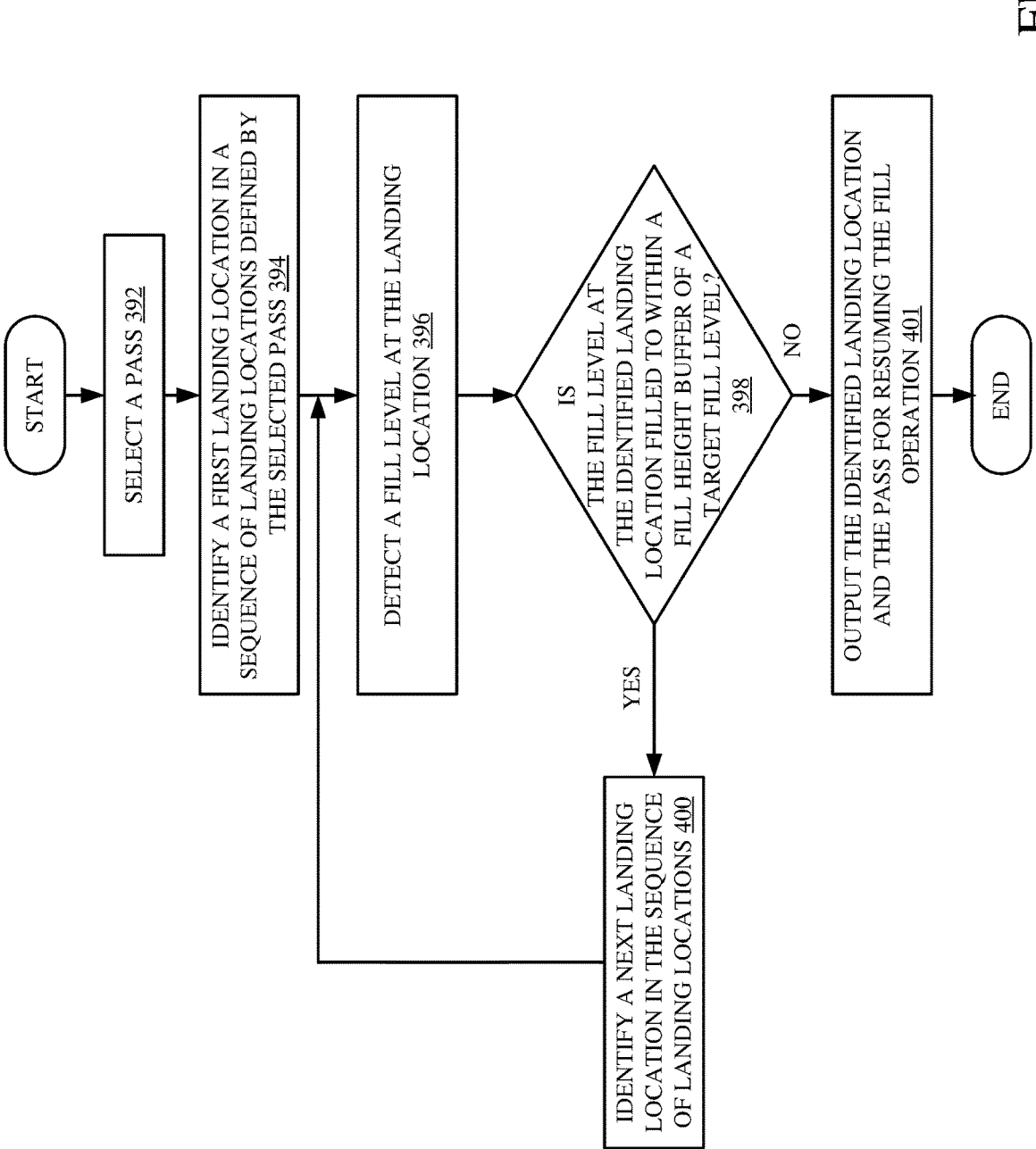
FIG. 8 is a flow diagram showing one example of controlling an unloading operation in resuming filling of a partially full receiving vehicle.

FIG. 8 is a flow diagram showing one example of the operation of unloading control system 150 (and specifically of resume loading processor 176) in determining where to resume loading a receiving vehicle 134 that is already partially filled. For example, assume that a receiving vehicle 134 was partially filled during a previous unloading operation by a harvester when the harvester finished unloading. At that point, assume that receiving vehicle 134 was then brought to leading vehicle 101 to be loaded. Referring to FIG. 6, at block 296, unloading control system 150 may receive a signal from fill level detector 162 indicating that receiving vehicle 134 is not completely empty, but is instead partially filled. Resume loading processor 176 then identifies where, in receiving vehicle 134, the initial landing point should be and what pass to perform in order to resume filling receiving vehicle 134. This can present some difficulties. FIG. 5E shows one example of such difficulties.

For instance, assume that the previous fill operation in FIG. 5E began over the axle of receiving vehicle 134 and then moved forward on the first pass as described above with respect to FIGS. 5B-5D. Assume further that the unloading operation terminated, because the harvester was empty, leaving receiving vehicle 134 with the fill profile illustrated by the solid line in FIG. 5E. In that case, a portion of material 380 has been loaded into receiving vehicle 134. However, there is a portion 382 at the forward end of receiving vehicle 134 where the fill level does not reach the desired target fill level 262. Thus, if the current filling operation were to be resumed precisely where the previous filling operation left off, then the initial landing point in vehicle 134 would be identified as a landing point proximate the region 382 that is not fully loaded to the desired fill level 262.

However, if this type of unloading operation were to be performed, and the initial landing point were chosen as point 384, for instance, then the material would quickly fill the region 382 and the following vehicle 136 would quickly need to be nudged forward by a large distance to move unloading to the next adjacent landing point for example, landing point 386. During the nudge operation, however, material would continue to be unloaded into receiving vehicle 134. This would likely result in the region 388 of receiving vehicle 134 being overfilled so that the fill height would surpass the desired target fill height 262, and the material may even spill over the upper edges of receiving vehicle 134.

Therefore, in one example, resume loading processor 176 identifies the initial location where filling of receiving vehicle 134 is to be resumed by implementing a fill level buffer 390. Fill level buffer 390 may be a fixed value, or a dynamically calculated value, or a default value, or a value input by an operator, among other things. The buffer 390 defines a fill level that is below the desired fill level 262 by a buffer distance (such as 10 cm, 5 cm, etc.). When determining where to resume the loading operation of receiving vehicle 134, resume loading processor 176 first identifies whether the reloading operation should be resumed on the first pass or the second pass. The pass can be identified based on the fill level at different points in the receiving vehicle 134. For example, if landing points along the first pass are all filled to the initial target fill level, then the first pass is complete, and filling should resume on the second pass. Processor 176 also identifies the location along that pass where the fill level of material at that location is less than the target fill level 262 and is also less than the fill level buffer 390.

Taking again the example shown in FIG. 5E, it can be seen that the region 382 of receiving vehicle 134 has sufficient material that the fill level in region 382 (while it is below the target fill level 262) exceeds the buffer 390. Therefore, for the sake of determining where to resume the unloading operation, processor 176 will consider the region 382 as being adequately filled. Thus, processor 176 will identify a next landing point on the second pass where the fill level is below buffer 390. Processor 176 then identifies that landing point as the initial landing point (or landing location) where the unloading operation is to be resumed. In the example shown in FIG. 5E, it can be seen that landing point 386 is the first point where the fill level drops below the fill level buffer 390. Thus, landing point 386 is chosen as the location to resume filling of the receiving vehicle 134.

Referring again to FIG. 8, resume loading processor 176 determines the fill level at different points along the first pass and then at different points along the second pass. Processor 176 thus can identify which landing point, and the pass, where the previous unloading operation finished and where the current unloading operation should be resumed. Therefore, pass selector 180 first selects which pass is being analyzed. Pass selector 180 can begin analyzing along the first pass to identify where material is filled to the initial target fill level 256 and then analyze along the second pass to identify where material is filled to the final target fill level 262. Assume, for the sake of the present discussion, that pass selector 180 has analyzed the first pass and determined that the first pass was completed during the previous unloading operation. Pass selector 180 then selects the second pass so that resume loading processor 176 analyzes the fill level at different possible landing points along the second pass. Selecting a pass is indicated by block 392 in the flow diagram of FIG. 8. Once the pass is selected, location selector 182 identifies a first landing point in a sequence of landing points defined by the selected pass, as indicated by block 394. For instance, given that the second pass has been selected for analysis, then referring to FIG. 5D, location selector 182 may identify the first landing point in the second pass (landing point 250) to determine whether the fill level meets the desired target fill level 262 or the buffer 390. Material level processor 184 detects the fill level at the selected landing point 250 and determines whether the fill level at the identified landing point is filled to at least the fill height buffer 390. Having material level processor 184 detect the fill level at the selected landing point 250 is indicated by block 396. Determining whether the fill level meets the fill height buffer 390 is indicated by block 398 in the flow diagram of FIG. 8. If the fill level at landing point 250 meets the fill height buffer 390, then location selector 182 selects a next landing point in receiving vehicle 134 (e.g., landing point 264) in the sequence of landing points defined by the second pass. Identifying a next landing point is indicated by block 400. Again, material level processor 184 determines whether material at landing point 264 meets the fill height buffer 390. This continues (with location selector 182 selecting a next adjacent landing point along the second pass and material level processor 184 determining whether the fill level at the selected landing point meets the fill height buffer 390) until a landing point is selected where the fill level does not meet the fill height buffer 390.

Output generator 186 then outputs the identified landing point and the pass for resuming the fill operation. For instance, output generator 186 may generate an output identifying landing point 264 as the initial landing point and identifying the second pass as the pass on which to resume the unloading operation. In that case, second pass controller 172 receives the landing point 264 as the first landing point in the second pass for resuming the unloading operation. Second pass controller 172 then begins the second pass of the unloading operation to fill receiving vehicle 134, beginning at landing point 264 and then continuing to subsequent landing points along the second pass until the second pass is complete. Outputting the identified landing point or landing location and the pass for resuming the fill operation is indicated by block 400 in the flow diagram of FIG. 8.

It can thus be seen that the present description describes a system that performs a multi-pass unloading operation. The material can first be loaded into an initial landing location in receiving vehicle 134 which may be over the axle of receiving vehicle 134, slightly forward of the axle, etc. The present system then performs a forward pass filling receiving vehicle 134 to an initial target fill height which is below the final target fill height. Once the front of the receiving vehicle 134 (or a deadband boundary) is reached on the first pass, then the present system performs a second pass filling receiving vehicle 134 in a front-to-back pattern to the final target fill height. In performing the fill operation, the present system can enforce a minimum nudge size threshold to control the frequency and size of the nudge operations. The present system can also incorporate a fill height buffer so that, when resuming a filling operation in a partially full receiving vehicle 134, the chances of overfilling the receiving vehicle are reduced.

Figure 9:
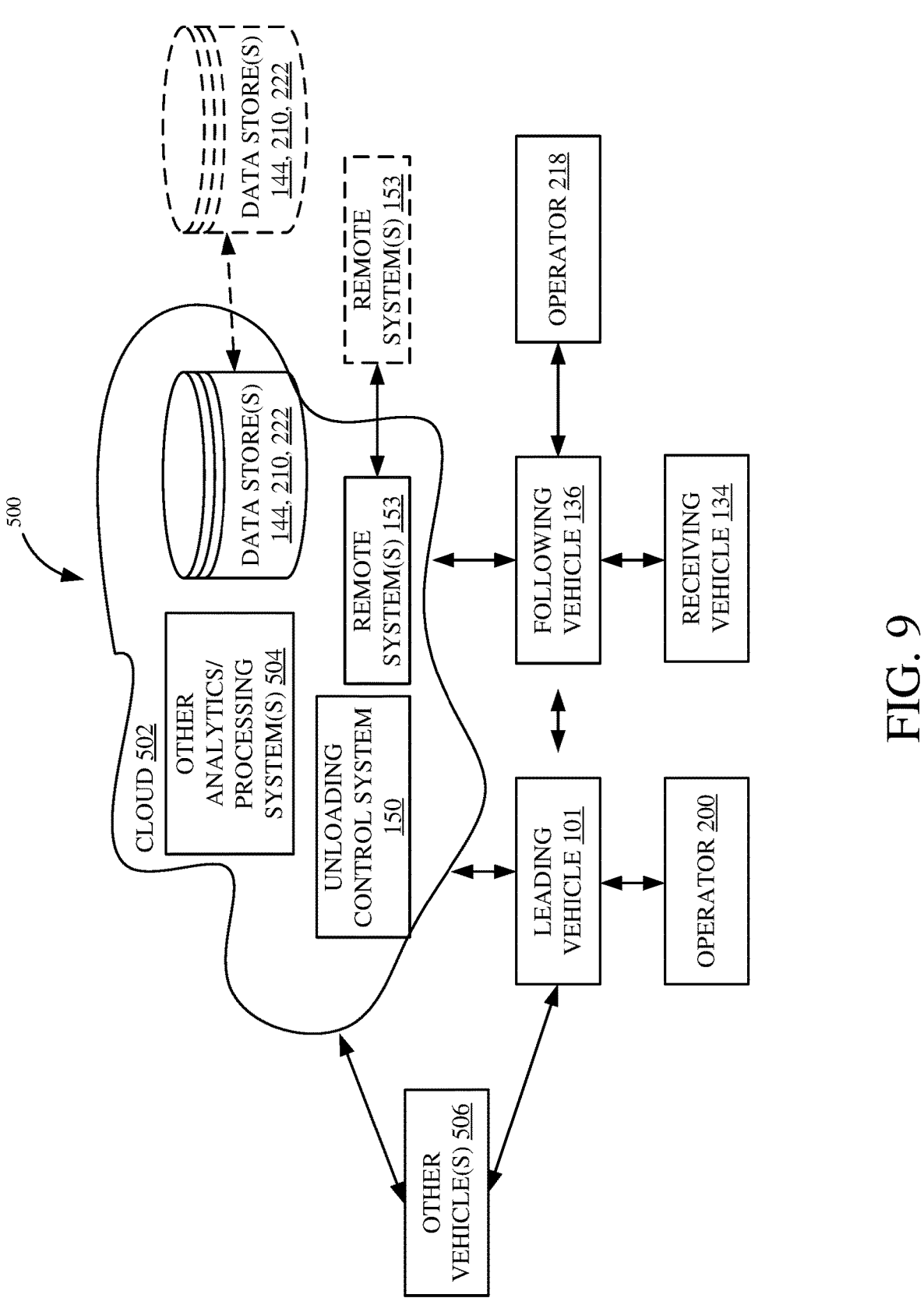
FIG. 9 is a block diagram showing one example of a harvesting machine deployed in a remote server architecture.

FIG. 9 is a block diagram illustrating agricultural system 140, shown in FIG. 4, except that system 140 is disposed in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 9, some items are similar to those shown in FIG. 4 and they are similarly numbered. FIG. 9 specifically shows that data stores 144, 210, 222, unloading control system 150, and other systems (such as analytics or processing systems) 504, can be located at a remote server location 502. Therefore, vehicles 101, 136 can access those systems through remote server location 502.

FIG. 9 also depicts another example of a remote server architecture. FIG. 9 shows that it is also contemplated that some elements of FIG. 4 can be disposed at remote server location while others are not. By way of example, one or more of data stores 144, 210, 222, and other systems 504, or other items can be disposed at a location separate from location 502, and accessed through the remote server at location 502. Regardless of where the items are located, the items can be accessed either directly by machine 101, 134, and/or machine 136, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. All of these architectures are contemplated herein.

Figure 10:
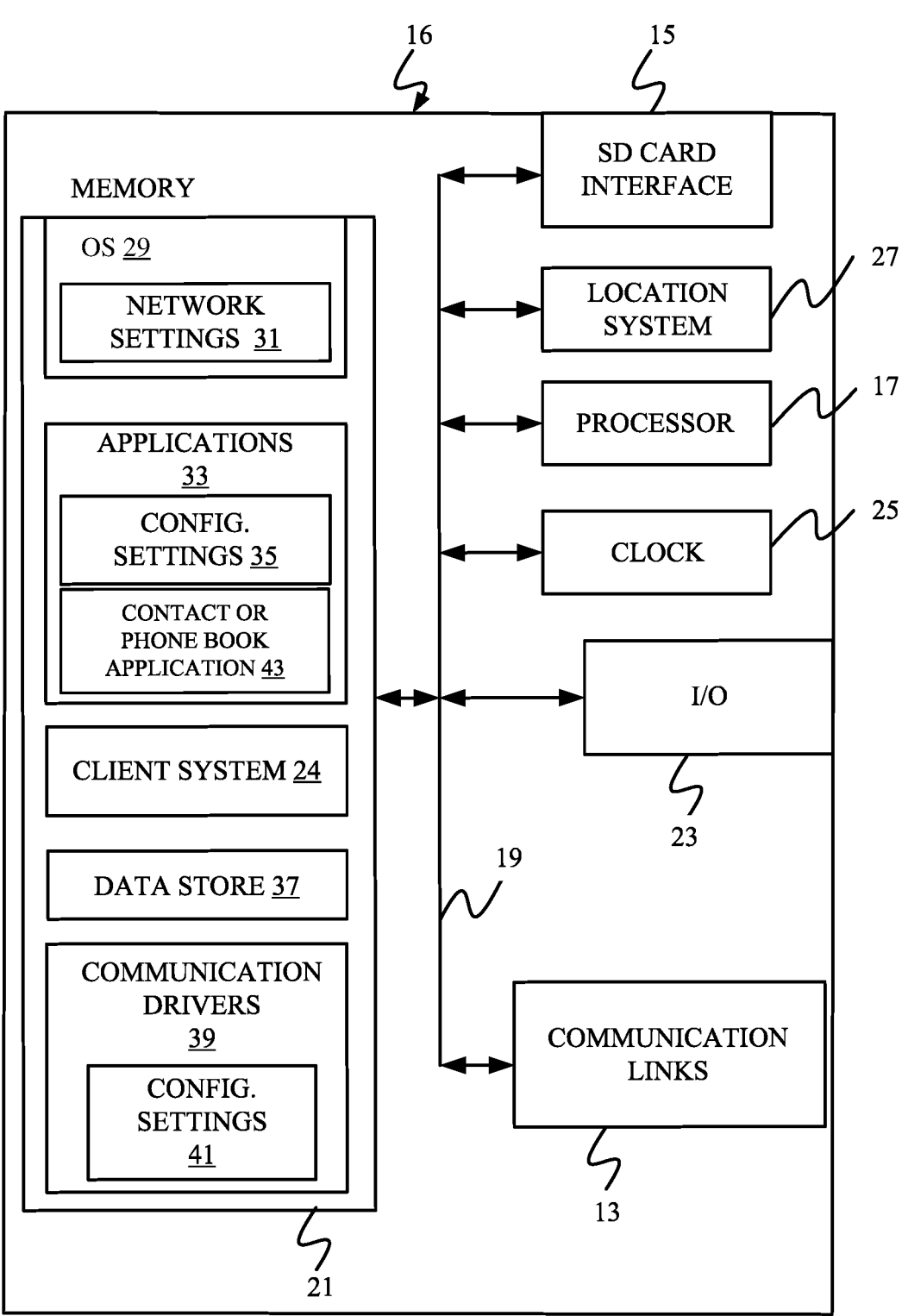
FIGS. 10-12 show examples of mobile devices that can be used in the machines and systems described in other figures.

FIG. 10 shows that other vehicles 506 can communicate with one or more vehicles 101, 136, or with remote server environment 502. It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
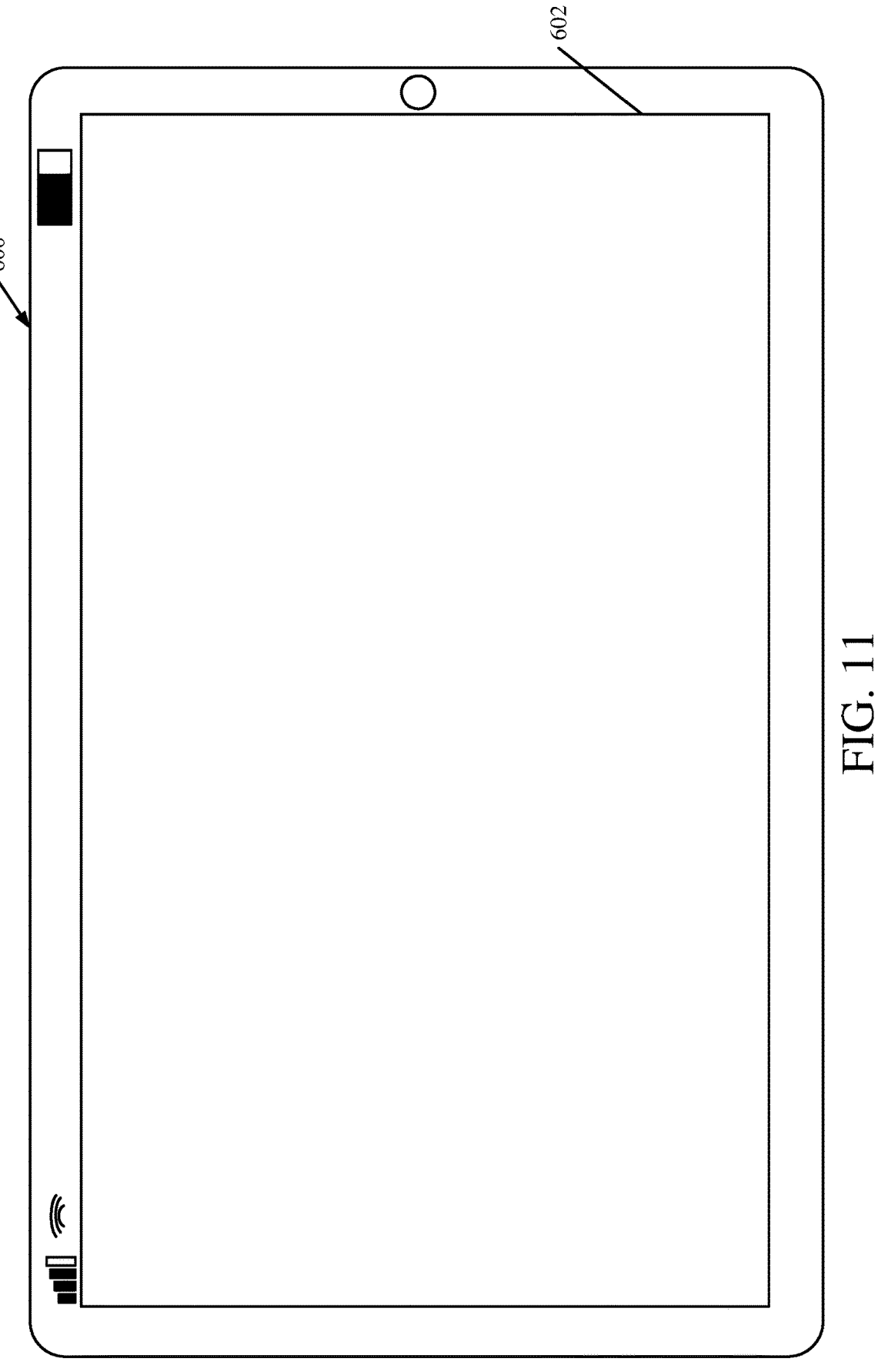
Figure 12:
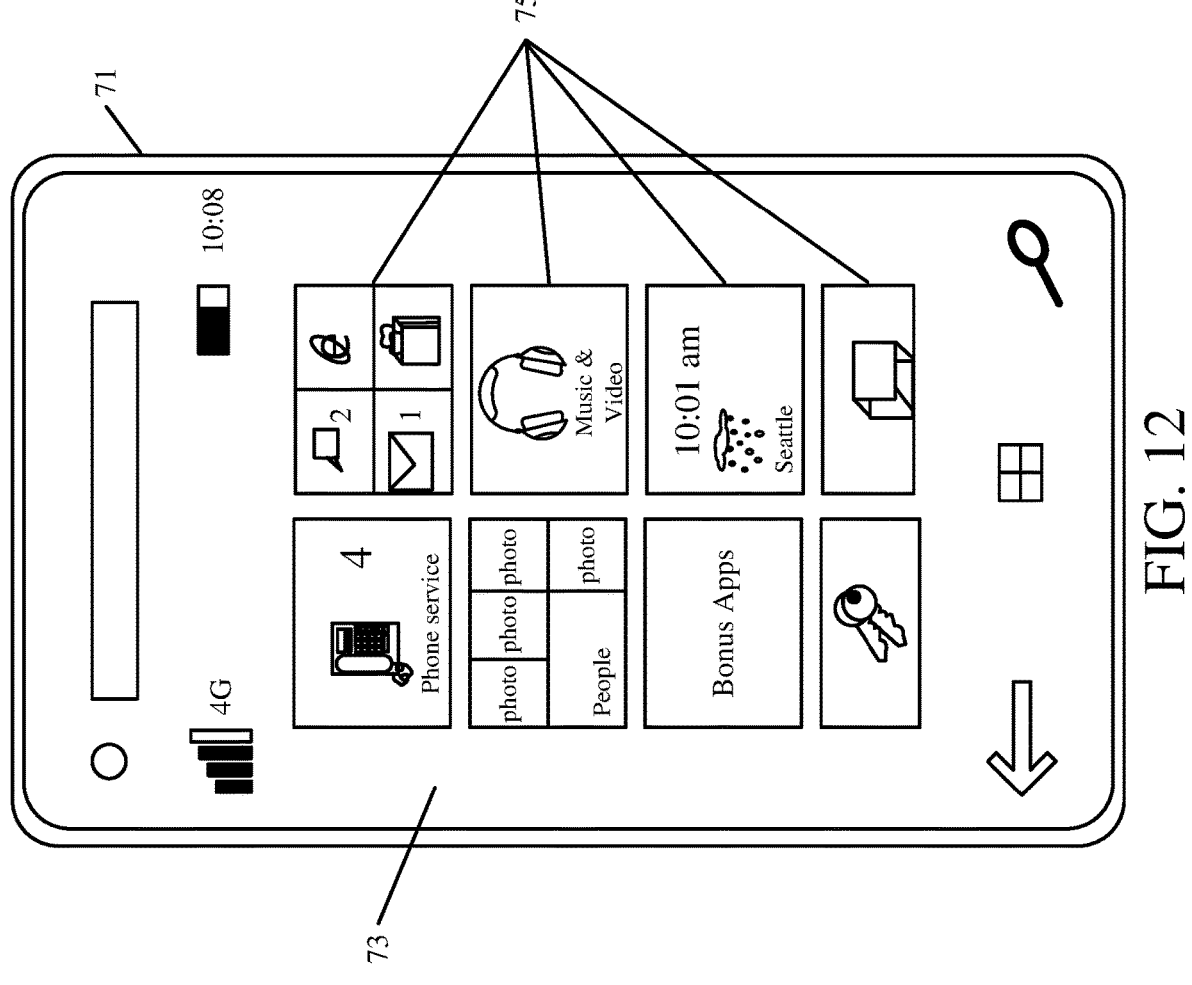

FIG. 9 is a simplified block diagram of one illustrative example of a handheld or mobile computing device that can be used as a user's or client's hand held device 16, in which the present system (or parts of it) can be deployed. For instance, a mobile device can be deployed in the operator compartment of one or both of vehicles 101, 136 for use in generating, processing, or displaying the calibrated offset values. FIGS. 11-12 are examples of handheld or mobile devices.

FIG. 10 provides a general block diagram of the components of a client device 16 that can run some components shown in FIG. 4, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 11 shows one example in which device 16 is a tablet computer 600. In FIG. 11, computer 600 is shown with user interface display screen 602. Screen 602 can be a touch screen or a pen-enabled interface that receives inputs from a pen or stylus. Tablet computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
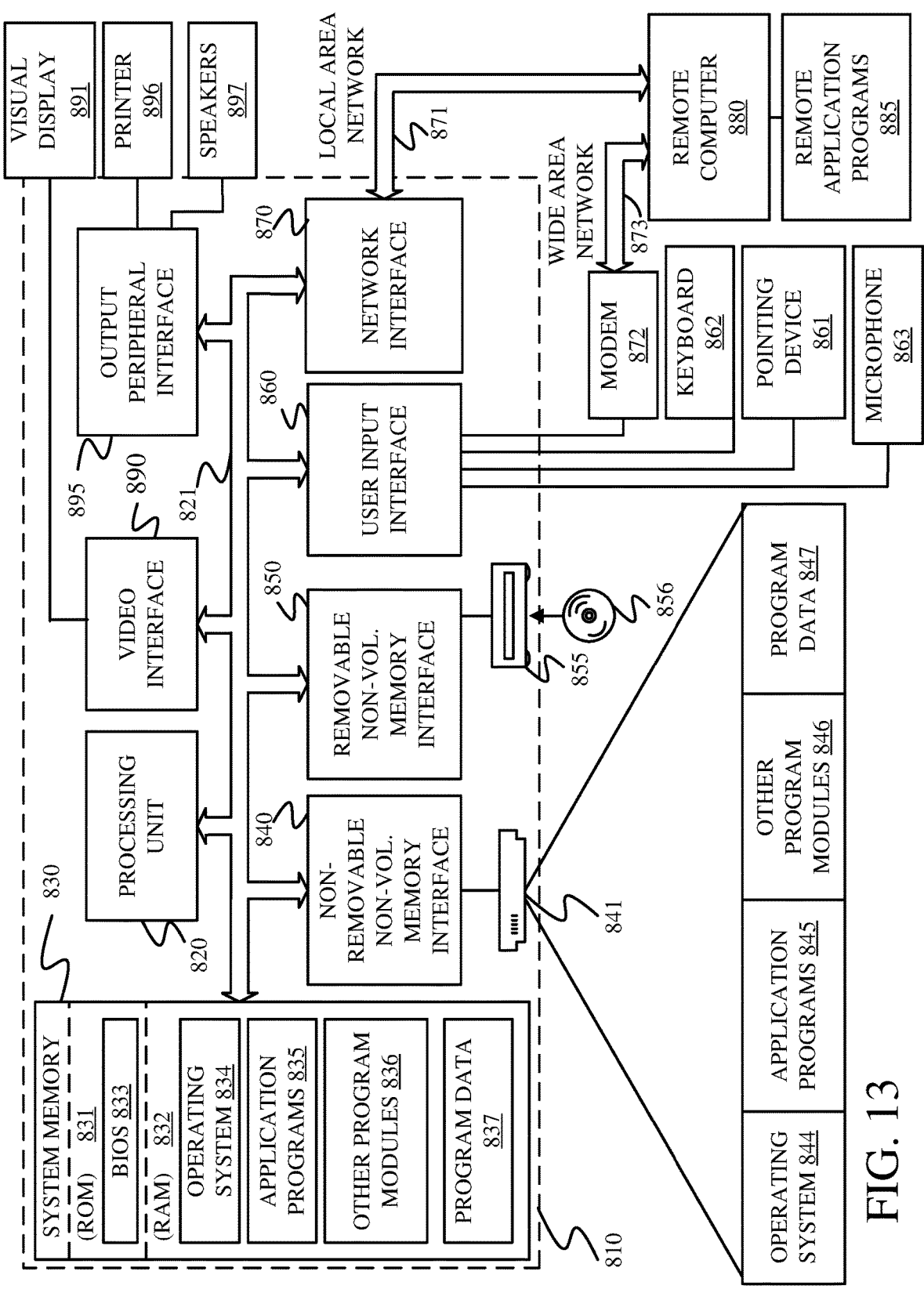
FIG. 13 is a block diagram showing one example of a computing environment that can be used in the machines and systems described with respect to previous figures.

FIG. 13 is one example of a computing environment in which elements of FIG. 4, or parts of it, (for example) can be deployed. With reference to FIG. 13, an example system for implementing some embodiments includes a computing device in the form of a computer 810 programmed to operate as discussed above. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:

identifying an initial landing point in a receiving vehicle to receive material from a leading vehicle during an unloading operation in which the material is unloaded from the leading vehicle into the receiving vehicle, the receiving vehicle being propelled by a following vehicle;

controlling the unloading operation to perform a first unloading pass in a first direction based on an initial fill level, the first unloading pass being controlled to unload the material into the receiving vehicle beginning at the initial landing point and then unloading material at each of a plurality of successive additional first pass landing points, each successive additional first pass landing point being displaced in the first direction from an immediately preceding first pass landing point;

detecting a fill level at a final first pass landing point;

based on a comparison of the fill level at the final first pass landing point to the initial fill level and without regard to a detected fill level at other first pass landing points, other than the final first pass landing point, initiating a second unloading pass in a second direction, opposite the first direction; and controlling the unloading operation to perform the second unloading pass based on a final fill level different from the initial fill level, the second unloading pass being controlled to unload the material into the receiving vehicle at each of a plurality of successive second pass landing points, each successive second pass landing point being displaced in the second direction from an immediately preceding second pass landing point.

2. The method of claim 1 wherein identifying an initial landing point comprises:

accessing dimension information indicative of a distance from a front wall of the receiving vehicle to a rear wall of the receiving vehicle; and automatically identifying the initial landing point based on the dimension information.

3. The method of claim 1 wherein identifying the initial landing point comprises:

accessing axle location information indicative of a location of an axle on the receiving vehicle; and automatically identifying the initial landing point based on the axle location information.

4. The method of claim 1 wherein identifying the initial landing point comprises:

displaying an operator interface with an initial landing point identification display element; and detecting operator interaction with the initial landing point identification display element to identify the initial landing point.

5. The method of claim 4, wherein displaying the operator interface comprises displaying a graphical operator interface including a pictorial illustration of the receiving vehicle and detecting, through the graphical operator interface, an operator input defining the initial landing point in the receiving vehicle.

6. The method of claim 1 wherein controlling the unloading operation to perform the first unloading pass in the first direction comprises:

detecting a fill level at the initial landing point;

comparing the detected fill level to the initial fill level;

when the detected fill level is within a threshold distance of the initial fill level, changing a relative position of the receiving vehicle relative to the leading vehicle by a nudge distance to unload material at a next successive first pass landing point; and repeating, for each next successive first pass landing point, detecting the fill level, comparing the fill level, and changing the relative position until the final first pass landing point is filled to the initial fill level.

7. The method of claim 6 wherein changing the relative position of the receiving vehicle relative to the leading vehicle by the nudge distance to unload material at the next successive first pass landing point comprises:

identifying a next possible landing point along the first pass that has a fill level below the initial fill level;

comparing a possible nudge distance, indicative of a distance from a current landing point to the identified next possible landing point, to a nudge distance threshold to obtain a distance comparison result; and setting the nudge distance based on the distance comparison result.

8. The method of claim 7 wherein comparing the possible nudge distance to the nudge distance threshold comprises identifying a larger of the nudge distance threshold and the possible nudge distance, and wherein setting the nudge distance comprises:

setting the nudge distance to the larger of the nudge distance threshold and the possible nudge distance.

9. The method of claim 1 and further comprising:

identifying the final first pass landing point based on a location of a front wall of the receiving vehicle and a size of a deadband offset value indicative of an offset from the front wall of the receiving vehicle.

10. The method of claim 1 wherein controlling the unloading operation to perform the second unloading pass in the second direction comprises:

detecting a fill level at a current second pass landing point;

comparing the detected fill level to the final fill level;

when the detected fill level is within a threshold distance of the final fill level, changing a relative position of the receiving vehicle relative to the leading vehicle by a nudge distance to unload material at a next successive second pass landing point displaced from the current second pass landing point in the second direction; and repeating, for each next successive second pass landing point, detecting the fill level, comparing the fill level, and changing the relative position until a final second pass landing point is filled to the final fill level.

11. The method of claim 10 wherein changing the relative position of the receiving vehicle relative to the leading vehicle by the nudge distance to unload material at the next successive second pass landing point comprises:

identifying a next possible landing point along the second pass that has a fill level below the final fill level;

comparing a possible nudge distance, indicative of a distance from a current landing point to the identified next possible landing point, to a nudge threshold distance to identify a larger of the nudge distance threshold and the possible nudge distance; and setting the nudge distance to the larger of the nudge distance threshold and the possible nudge distance.

12. The method of claim 1 and further comprising:

identifying a final second pass landing point based on a location of a rear wall of the receiving vehicle and a size of a deadband offset value indicative of an offset from the rear wall of the receiving vehicle.

13. The method of claim 1 and further comprising:

prior to identifying the initial landing point, detecting that the receiving vehicle is partially filled with material; and identifying, as a possible initial landing point, a landing point in the receiving vehicle that has a fill level below the final fill level by a fill buffer value, and wherein identifying the initial landing point comprises identifying the initial landing point based on the identified possible initial landing point.

14. The method of claim 13 wherein controlling the unloading operation comprises:

identifying a prior pass indicative of whether a prior unloading operation finished during a prior operation first unloading pass or a prior operation second unloading pass;

identifying a termination landing point where the prior unloading operation finished; and controlling the unloading operation based on the identified prior pass and the identified termination landing point.

15. An unloading system, comprising:

an initial value identifier configured to identify an initial landing point in a receiving vehicle to receive material from a leading vehicle during an unloading operation in which the material is unloaded from the leading vehicle into the receiving vehicle, the receiving vehicle being propelled by a following vehicle;

a fill level detector configured to detect a level of material in the receiving vehicle; and an unloading control system configured to, when the fill level detector detects that the receiving vehicle is empty, control the unloading operation to perform a first unloading pass in a first direction unloading the material into the receiving vehicle beginning at the initial landing point and then unloading material at each of a plurality of successive landing points spaced from one another in the first direction, based on an initial fill level and to perform a second unloading pass in a second direction, opposite the first direction, unloading the material into the receiving vehicle at second pass landing points, based on a final fill level that is different from the initial fill level, wherein the unloading control system is configured to set, during the first unloading pass, a lockout condition that inhibits landing point movement in the second direction prior to the second unloading pass.

16. The unloading system of claim 15 wherein the fill level detector is configured to generate a fill level signal indicative of the detected fill level and wherein the unloading control system is configured to receive the fill level signal from the fill level detector and, when the detected fill level is within a threshold distance of a desired fill level, generate a control signal to change a relative position of the receiving vehicle relative to the leading vehicle by a nudge distance, that meets a minimum nudge distance threshold, to unload material at a next successive landing point.

17. The unloading system of claim 15 wherein the unloading control system comprises:

a resume loading processor configured to, when the fill level detector detects that the receiving vehicle is partially filled with material, identify, as a possible initial landing point, a landing point in the receiving vehicle that has a fill level below the final fill level by a fill level buffer value, and wherein identifying the initial landing point comprises identifying the initial landing point based on the identified possible initial landing point.

18. A method comprising:

identifying an initial landing point in a receiving vehicle to receive material from a leading vehicle during an unloading operation in which the material is unloaded from the leading vehicle into the receiving vehicle, the receiving vehicle being propelled by a following vehicle;

controlling the unloading operation to perform a first unloading pass in a first direction based on an initial fill level, the first unloading pass being controlled to unload the material into the receiving vehicle beginning at the initial landing point and then unloading material at each of a plurality of successive additional first pass landing points, each successive additional first pass landing point being displaced in the first direction from an immediately preceding first pass landing point;

detecting a fill level at a final first pass landing point;

based on a comparison of the detected fill level at the final first pass landing point to the initial fill level, controlling the unloading operation to initiate a second unloading pass in a second direction, opposite the first direction, based on a final fill level different from the initial fill level, the second unloading pass being controlled to unload the material into the receiving vehicle at each of a plurality of successive second pass landing points, each successive second pass landing point being displaced in the second direction from an immediately preceding second pass landing point; and setting, during the first unloading pass, a lockout condition that inhibits landing point movement in the second direction prior to the initiation of the second unloading pass.

19. The method of claim 18, and further comprising:

displaying a graphical operator interface including a pictorial illustration of a receiving vehicle; and detecting, through the graphical operator interface, an operator input defining an initial landing point in the receiving vehicle.

20. The method of claim 18, wherein controlling the unloading operation to perform the first unloading pass in the first direction comprises:

detecting a fill level at the initial landing point;

comparing the detected fill level to the initial fill level;

when the detected fill level is within a threshold distance of the initial fill level, changing a relative position of the receiving vehicle relative to the leading vehicle by a nudge distance to unload material at a next successive first pass landing point; and repeating, for each next successive first pass landing point, detecting the fill level, comparing the fill level, and changing the relative position until the final first pass landing point is filled to the initial fill level.

* * * * *